US012512058B2

(12) United States Patent
Kim et al.

(10) Patent No.: US 12,512,058 B2
(45) Date of Patent: Dec. 30, 2025

(54) DISPLAY DEVICE AND METHOD OF DRIVING THE SAME

(71) Applicant: Samsung Display Co., LTD., Yongin-si (KR)

(72) Inventors: Kyung Ho Kim, Yongin-si (KR); Gi Chang Lee, Yongin-si (KR); Sung Yoon Hwang, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/775,875

(22) Filed: Jul. 17, 2024

(65) Prior Publication Data

US 2025/0148978 A1 May 8, 2025

(30) Foreign Application Priority Data

Nov. 6, 2023 (KR) ........................ 10-2023-0151746

(51) Int. Cl.
*G09G 3/3233* (2016.01)
*G09G 3/20* (2006.01)
*G09G 3/3266* (2016.01)

(52) U.S. Cl.
CPC ......... *G09G 3/3233* (2013.01); *G09G 3/2096* (2013.01); *G09G 3/3266* (2013.01); *G09G 2300/0819* (2013.01); *G09G 2300/0842* (2013.01); *G09G 2300/0861* (2013.01); *G09G 2310/0286* (2013.01); *G09G 2310/08* (2013.01); *G09G 2320/0233* (2013.01); *G09G 2320/0238* (2013.01); *G09G 2330/021* (2013.01); *G09G 2340/0435* (2013.01)

(58) Field of Classification Search
None
See application file for complete search history.

(56) References Cited

U.S. PATENT DOCUMENTS

| | | | |
|---|---|---|---|
| 10,163,397 | B2 | 12/2018 | Son et al. |
| 11,195,465 | B2 | 12/2021 | Lee et al. |
| 11,475,850 | B2 | 10/2022 | Cho et al. |

(Continued)

FOREIGN PATENT DOCUMENTS

| | | | |
|---|---|---|---|
| CN | 112509517 | B | 7/2022 |
| KR | 10-2020-0086783 | A | 7/2020 |

(Continued)

OTHER PUBLICATIONS

International Search Report dated Nov. 8, 2024, corresponding to PCT/KR2024/011832, 3 pages.

*Primary Examiner* — Christopher J Kohlman
(74) *Attorney, Agent, or Firm* — Womble Bond Dickinson (US) LLP

(57) ABSTRACT

A display device includes: pixels connected to scan lines and emission control lines; a scan driver to supply a scan signal to the scan lines according to scan clock signals; a first emission driver to supply a first emission control signal to the emission control lines according to emission clock signals, when the display device is driven in a first mode; a second emission driver to supply a second emission control signal to the emission control lines according to the scan signal, when the display device is driven in a second mode; and a timing controller to control the scan driver, the first emission driver, and the second emission driver.

25 Claims, 20 Drawing Sheets

(56) References Cited

U.S. PATENT DOCUMENTS

| | | | | |
|---|---|---|---|---|
| 11,887,540 | B2 | 1/2024 | Mi | |
| 2014/0146029 | A1 * | 5/2014 | Hong | G09G 3/3233 345/82 |
| 2023/0105490 | A1 | 4/2023 | Park et al. | |
| 2024/0304144 | A1 | 9/2024 | Sano | |

FOREIGN PATENT DOCUMENTS

| | | | |
|---|---|---|---|
| KR | 10-2022-0026659 | A | 3/2022 |
| KR | 10-2498276 | B1 | 2/2023 |
| KR | 10-2023-0049175 | A | 4/2023 |
| KR | 10-2569729 | B1 | 8/2023 |
| WO | WO 2022/157822 | A1 | 7/2022 |

* cited by examiner

SL2 : SL2i, SL3i, SL4i, SL5i

SL2 : SL2i, SL3i, SL4i, SL5i

SL2 : SL2i, SL3i, SL4i, SL5i

GVN: GVN1, GVN2, ..., GVNi, ..., GVNn
GVF: GVF1, GVF2, ..., GVFi, ..., GVFn
GVBF: GVBF1, GVBF2, ..., GVBFi, ..., GVBFn

DISPLAY DEVICE AND METHOD OF DRIVING THE SAME

CROSS-REFERENCE TO RELATED APPLICATION

The present application claims priority to and the benefit of Korean patent application No. 10-2023-0151746, filed on Nov. 6, 2023, in the Korean Intellectual Property Office, the entire disclosure of which is incorporated by reference herein.

BACKGROUND

1. Field

Aspects of embodiments of the present disclosure relate to a display device, and a method of driving the display device.

2. Related Art

With the development of information technologies, the importance of a display device, which is a connection medium between a user and information, has increased. Accordingly, various display devices, such as a liquid crystal display device and an organic light emitting display device, are being increasingly used.

Recently, display devices may include a high-speed driving function for providing users with images that are changed at a high frame frequency, and a low-speed driving function for providing users with images that are changed at a low frame frequency. As such, a method for minimizing or reducing power consumption when a display device is driven at a high speed and a low speed may be desired.

The above information disclosed in this Background section is for enhancement of understanding of the background of the present disclosure, and therefore, it may contain information that does not constitute prior art.

SUMMARY

Embodiments of the present disclosure may be directed to a display device and a method of driving the display device, which may reduce power consumption.

According to one or more embodiments of the present disclosure, a display device includes: pixels connected to scan lines and emission control lines; a scan driver configured to supply a scan signal to the scan lines according to scan clock signals; a first emission driver configured to supply a first emission control signal to the emission control lines according to emission clock signals, when the display device is driven in a first mode; a second emission driver configured to supply a second emission control signal to the emission control lines according to the scan signal, when the display device is driven in a second mode; and a timing controller configured to control the scan driver, the first emission driver, and the second emission driver.

In an embodiment, an active period of one frame may include the first mode, and the first mode may be a display scan period in which a data signal is supplied to the pixels. A blank period of the one frame may include the second mode, and the second mode may be a self-scan period in which the data signal is not supplied.

In an embodiment, the first mode may be a high frequency driving mode in which the display device may be driven at a high frequency equal to or higher than a reference frequency, and the second mode may be a low frequency driving mode in which the display device may be driven at a low frequency lower than the reference frequency.

In an embodiment, the timing controller may be configured to not supply the emission clock signals to the first emission driver when the display device is driven in the second mode.

In an embodiment, the scan driver may include a plurality of stage circuits configured to supply the scan signal, and a stage circuit from among the plurality of stage circuits may include: a first input terminal configured to receive a previous scan signal; a second input terminal configured to receive a first scan clock signal; a third input terminal configured to receive a second scan clock signal; a first output terminal configured to output the scan signal; a second output terminal configured to output an inverting scan signal; a first power input terminal configured to receive a first power source; and a second power input terminal configured to receive a second power source lower than the first power source.

In an embodiment, the stage circuit may further include: an input circuit configured to receive the previous scan signal; a driver configured to invert and output an output signal of the input circuit; an output circuit configured to invert and output an output signal of the driver; and a first capacitor connected between a common terminal of the input circuit and the driver and the second power input terminal.

In an embodiment, the input circuit may include a transmission gate connected between the first input terminal and the driver, and the transmission gate may include a P-type first transistor and an N-type second transistor that are connected in parallel between the first input terminal and the driver. A gate electrode of the first transistor may be connected to the second input terminal, and a gate electrode of the second transistor may be connected to the third input terminal.

In an embodiment, the driver may include a P-type third transistor and an N-type fourth transistor that are connected in series between the first power input terminal and the second power input terminal. Gate electrodes of the third transistor and the fourth transistor may be connected to the input circuit, and a common node of the third transistor and the fourth transistor may be connected to the second output terminal.

In an embodiment, the output circuit may include a P-type fifth transistor and an N-type sixth transistor that are connected in series between the first power input terminal and the second power input terminal. Gate electrodes of the fifth transistor and the sixth transistor may be connected to the second output terminal, and a common node of the fifth transistor and the sixth transistor may be connected to the first output terminal.

In an embodiment, the timing controller may be configured to: supply a high-level first control signal and a low-level second control signal to the first emission driver and the second emission driver when the display device is driven in the first mode; and supply a low-level first control signal and a high-level second control signal to the first emission driver and the second emission driver when the display device is driven in the second mode.

In an embodiment, the first emission driver may be configured to be driven when the high-level first control signal and the low-level second control signal are supplied, and the second emission driver may be configured to be driven when the low-level first control signal and the high-level second control signal are supplied.

In an embodiment, the first emission driver may include a plurality of stage circuits configured to supply the first emission control signal, and a stage circuit from among the plurality of stage circuits may include: a first input terminal configured to receive a previous first emission control signal; a second input terminal configured to receive a first emission clock signal; a third input terminal configured to receive a second emission clock signal; a fourth input terminal configured to receive the first control signal; a fifth input terminal configured to receive the second control signal; a first power input terminal configured to receive a first power source; a second power input terminal configured to receive a second power source lower than the first power source; and an output terminal configured to output the first emission control signal.

In an embodiment, the stage circuit may further include: an input circuit configured to receive the previous first emission control signal; a first driver configured to invert and output an output signal of the input circuit; an output circuit configured to invert and output an output signal of the first driver; a second driver configured to electrically connect the first driver and the output circuit to each other when the high-level first control signal and the low-level second control signal are input, and block an electrical connection between the first driver and the output circuit in other cases; and a first capacitor connected between a common terminal of the input circuit and the first driver and the second power input terminal.

In an embodiment, the input circuit may include a transmission gate connected between the first input terminal and the first driver, and the transmission gate may include a P-type first transistor and an N-type second transistor that are connected in parallel between the first input terminal and the first driver. A gate electrode of the first transistor may be connected to the second input terminal, and a gate electrode of the second transistor may be connected to the third input terminal.

In an embodiment, the first driver may include a P-type third transistor and an N-type fourth transistor that are connected in series between the first power input terminal and the second power input terminal. Gate electrodes of the third transistor and the fourth transistor may be connected to the input circuit, and a common node of the third transistor and the fourth transistor may be connected to the second driver.

In an embodiment, the second driver may include: a P-type seventh transistor connected between the first power input terminal and a first node, and including a gate electrode connected to the fourth input terminal; an N-type eighth transistor connected between the first node and the first driver, and including a gate electrode connected to the fourth input terminal; an N-type ninth transistor connected between the second power input terminal and a second node, and including a gate electrode connected to the fifth input terminal; and a P-type tenth transistor connected between the second node and the first driver, and including a gate electrode connected to the fifth input terminal.

In an embodiment, the output circuit may include a P-type fifth transistor and an N-type sixth transistor that are connected in series between the first power input terminal and the second power input terminal. A gate electrode of the fifth transistor may be connected to the first node, a gate electrode of the sixth transistor may be connected to the second node, and a common node of the fifth transistor and the sixth transistor may be connected to the output terminal.

In an embodiment, the second emission driver may include a plurality of stage circuits configured to supply the second emission control signal, and a stage circuit from among the plurality of stage circuits may include: a first input terminal configured to receive a next scan signal; a second input terminal configured to receive a previous scan signal; a third input terminal configured to receive a previous inverting scan signal; a fourth input terminal configured to receive the second control signal; a fifth input terminal configured to receive the first control signal; a first power input terminal configured to receive a first power source; a second power input terminal configured to receive a second power source lower than the first power source; and an output terminal configured to output the second emission control signal.

In an embodiment, the stage circuit may further include: an input circuit configured to receive the next scan signal, the previous scan signal, and the previous inverting scan signal; and an output circuit configured to output the second emission control signal according to a signal supplied from the input circuit, when the low-level first control signal and the high-level second control signal are input.

In an embodiment, the input circuit may include: a first transmission gate connected between the first input terminal and a first node; a third transmission gate connected between the third input terminal and a second node; and a second transmission gate connected between the second input terminal and a third node.

In an embodiment, each of the first transmission gate, the second transmission gate, and the third transmission gate may include: a P-type first transistor including a gate electrode connected to the fifth input terminal; and an N-type second transistor including a gate electrode connected to the fourth input terminal.

In an embodiment, the output circuit may include: a P-type third transistor connected between the first power input terminal and a fourth node, and including a gate electrode connected to the first node; an N-type fourth transistor connected between the fourth node and the second power input terminal, and including a gate electrode connected to the second node; a P-type fifth transistor connected between the first power input terminal and the output terminal, and including a gate electrode connected to the third node; an N-type sixth transistor connected between the output terminal and the second power input terminal, and including a gate electrode connected to the fourth node; a P-type seventh transistor connected between the first power input terminal and the third node, and including the gate electrode connected to the fourth input terminal; an N-type eighth transistor connected between the fourth node and the second power input terminal, and including a gate electrode connected to the fifth input terminal; and a first capacitor connected between the fourth node and the second power input terminal.

According to one or more embodiments of the present disclosure, a method of driving a display device, includes: sequentially supplying a scan signal to scan lines; supplying, by a first emission driver, a first emission control signal using an emission clock signal, when the display device is driven in a first mode; and supplying, by a second emission driver, a second emission control signal using the scan signal, when the display device is driven in a second mode different from the first mode.

In an embodiment, an active period of one frame may include the first mode, and the first mode may be a display scan period in which a data signal is supplied to pixels. A blank period of the one frame may include the second mode, and the second mode may be a self-scan period in which the data signal is not supplied.

In an embodiment, the first mode may be a high frequency driving mode in which the display device is driven at a high frequency equal to or higher than a reference frequency, and the second mode may be a low frequency driving mode in which the display device is driven at a low frequency lower than the reference frequency.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
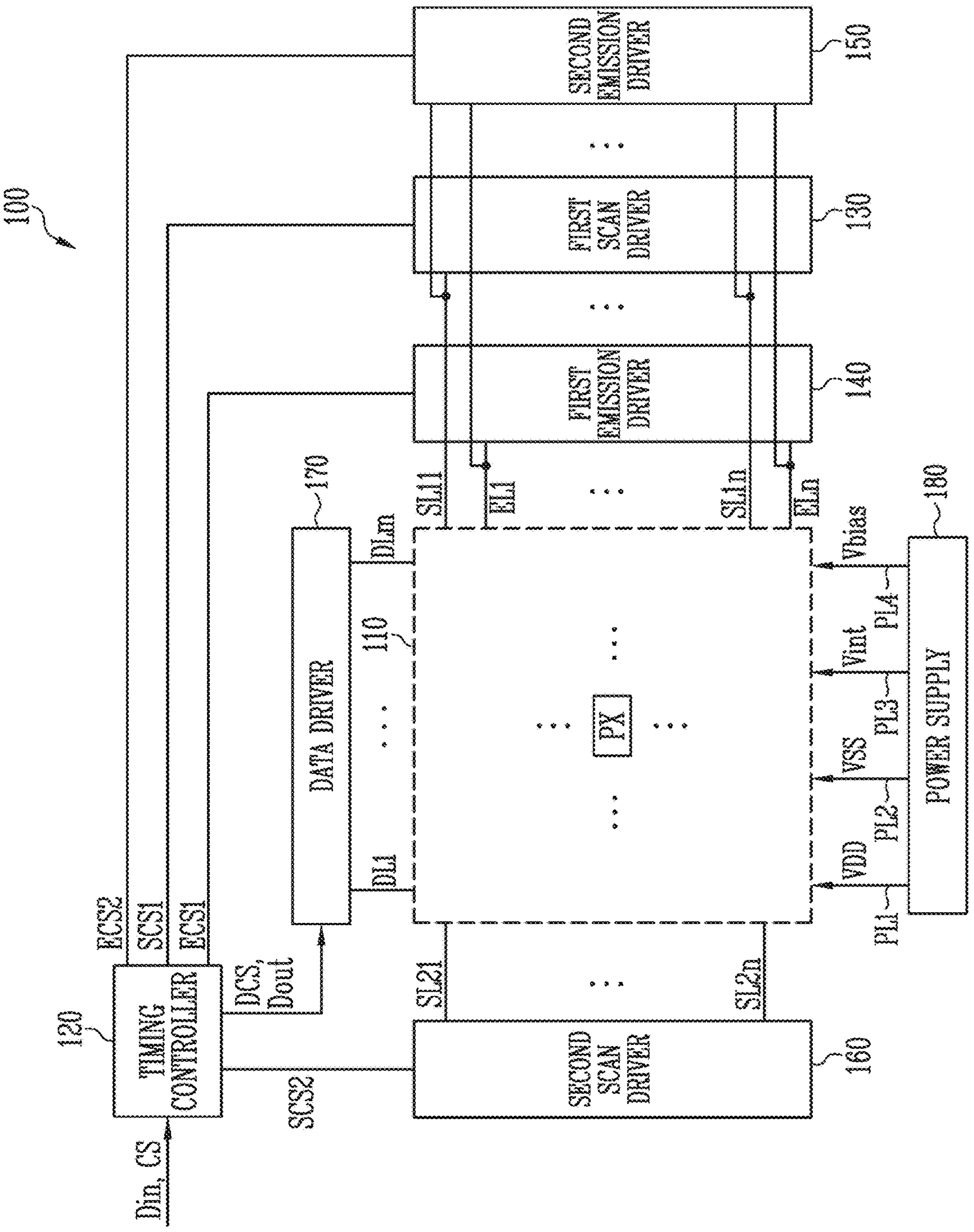
FIG. 1 is a diagram illustrating a display device in accordance with an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Some embodiments are described in the accompanying drawings in relation to functional blocks, units, and/or modules. Those skilled in the art will understand that these blocks, units, and/or modules may be physically implemented by logic circuits, individual components, microprocessors, hard wire circuits, memory elements, line connections, and other electronic circuits. These may be formed by using semiconductor-based manufacturing techniques or other manufacturing techniques. In the case of the blocks, units, and/or modules implemented by microprocessors or other similar hardware, the units, and/or modules may be programmed and controlled by using software to perform various functions described in the present disclosure, and may be selectively driven by using firmware and/or software. In addition, each block, each unit, and/or each module may be implemented by dedicated hardware, or by a combination of dedicated hardware to perform some functions of the blocks, the units, and/or the modules, and a processor (e.g., one or more programmed microprocessors and associated circuitry) to perform other functions of the blocks, the units, and/or the modules. In some embodiments, the blocks, the units, and/or the modules may be physically separated into two or more individual blocks, two or more individual units, and/or two or more individual modules. Also, in some embodiments, the blocks, the units, and/or the modules may be physically separated into more complex blocks, more complex units, and/or more complex modules.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device in accordance with an embodiment of the present disclosure.

Referring to FIG. 1, the display device 100 according to an embodiment of the present disclosure may include a pixel unit 110 (e.g., a display panel), a timing controller 120, a first scan driver 130, a first emission driver 140, a second emission driver 150, a second scan driver 160, a data driver 170, and a power supply 180.

The display device 100 may display an image at various image refresh rates (e.g., driving frequencies or screen refresh rates) according to driving conditions. The image refresh rate may refer to a frequency at which a data signal is written to a driving transistor of a pixel PX. For example, the image refresh rate may also be referred to as a screen scan rate or a screen refresh frequency, and may represent a frequency at which a display screen is reproduced for one second.

In an embodiment, an output frequency of the data driver 170 with respect to one horizontal line (e.g., the pixels PX connected to the same scan line as each other may be sorted as one horizontal line (e.g. a pixel row)) and/or an output frequency of the second scan driver 160 that outputs a second scan signal (e.g., a writing scan signal) may be determined corresponding to the image refresh rate. For example, an image refresh rate for driving a moving image may be a frequency of about 60 Hz or higher (e.g., 120 Hz, 240 Hz, or the like).

For example, the display device 100 may display an image corresponding to various image refresh rates of 1 Hz to 240 Hz. However, the present disclosure is not limited thereto, and the display device 100 may also display an image at an image refresh rate of 240 Hz or higher (e.g., 480 Hz). In an embodiment, the display device 100 may selectively drive the first emission driver 140 and the second emission driver 150 according to a driving condition (e.g., a mode).

The pixel unit 110 may include the pixels PX connected to data lines DL1 to DLm, scan lines SL11 to SL1*n* and SL21 to SL2*n*, emission control lines EL1 to ELn, and power lines PL1, PL2, PL3, and PL4 (where n and m are natural numbers of 2 or more). The pixels PX may be referred to as sub-pixels.

Figure 3A:
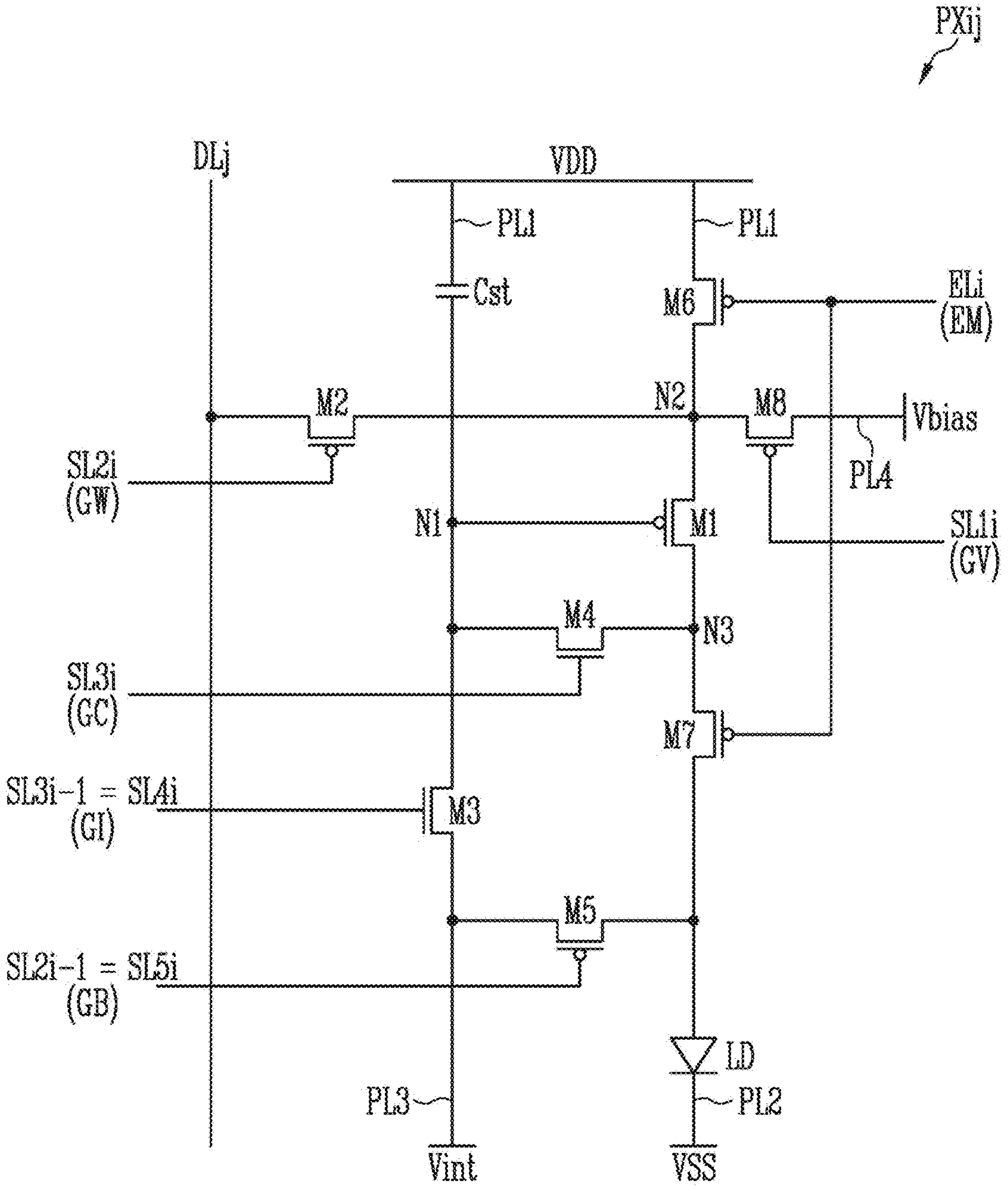
FIGS. 3A-3C are diagrams illustrating one or more embodiments of a pixel shown in FIG. 1.

In an embodiment, the scan lines connected to the pixels PX may be variously modified corresponding to a structure of each of the pixels PX. In an example, each of second scan lines SL21 to SL2*n* may further include a plurality of scan lines for each horizontal line. As shown in FIG. 3A, a pixel PXij located on an ith horizontal line (e.g., an ith pixel row) and a jth vertical line (e.g., a jth pixel column) may be connected to an ith first scan line SL1*i*, an ith second scan line SL2*i*, an ith third scan line SL3*i*, an ith fourth scan line SL4*i*, an ith fifth scan line SL5*i*, an ith emission control line ELi, and a jth data line DLj (where i is a natural number of n or less, and j is a natural number of m or less). The ith second scan line SL2*i*, the ith third scan line SL3*i*, the ith fourth scan line SL4*i*, and the ith fifth scan line SL5*i* may be included in a second scan line SL2 driven by the second scan driver 160.

A scan driver may be sorted according to configurations and operations of the first scan driver 130 and the second scan driver 160. However, the sorting of the scan driver is not limited thereto, and the second driver 160 may further include a plurality of scan drivers. At least some of the scan drivers may be integrated into one driving circuit, one module, or the like.

The second scan driver 160 may supply an enable second scan signal to the second scan lines SL21 to SL2*n* according to a second driving control signal SCS2 supplied from the timing controller 120. For example, the second scan driver 160 may sequentially supply the enable second scan signal to the second scan lines SL21 to SL2*n*. When the enable second scan signal is supplied, the pixels PX may be selected in a horizontal line unit (e.g., a pixel row unit or a pixel row), and a data signal may be supplied to the pixels PX. The enable second scan signal may have (e.g., may be set to) a gate-on voltage. As an example, an enable second scan signal having a low level may be supplied to a P-type transistor, and an enable second scan signal having a high level may be supplied to an N-type transistor.

In an embodiment, the second scan driver 160 may supply an enable second scan signal in a display scan period of one frame. As an example, the second scan driver 160 may supply at least one second scan signal to each of the second scan lines SL21 to SL2*n* during the display scan period.

The first scan driver 130 may supply an enable first scan signal (e.g., a scan signal) to the first scan lines SL11 to SL1*n* according to a first driving control signal SCS1 supplied from the timing controller 120. In an embodiment, the first scan driver 130 may sequentially supply the enable first scan signal to the first scan lines SL11 to SL1*n*. When the enable first scan signal is supplied, a bias voltage may be supplied to a driving transistor included in each of the pixels PX. The enable first scan signal may have (e.g., may be set to) a gate-on voltage.

In an embodiment, the first scan driver 130 may supply an enable first scan signal during a display scan period and a self-scan period of one frame. For example, the first scan driver 130 may perform scanning once (e.g., may supply at least one enable first scan signal) during the display scan period, and may perform scanning at least once according to the image refresh rate during the self-scan period. When the image refresh rate is decreased (e.g., when a frame length is lengthened), a number of times an operation, in which the first scan driver 130 supplies the enable first scan signal to each of the first scan lines SL11 to SL1*n* in one frame period, is repeated may be increased.

An emission driver may include the first emission driver 140 and the second emission driver 150. The first emission driver 140 and the second emission driver 150 may be selectively driven according to a driving mode of the display device 100. For example, the first emission driver 140 may sequentially supply a disable emission control signal (e.g., a first emission control signal) to the emission control lines EL1 to ELn when the display device 100 is driven in a first mode, and the second emission driver 150 may sequentially supply a disable emission control signal (e.g., a second emission control signal) to the emission control lines EL1 to ELn when the display device 100 is driven in a second mode.

The disable emission control signal may have (e.g., may be set to) a gate-off voltage. A transistor supplied with the disable emission control signal may be turned off (e.g., may be set to be in a turn-off state). As an example, a disable emission control signal having a high level may be supplied to the P-type transistor, and a disable emission control signal having a low level may be supplied to the N-type transistor.

In an embodiment, the first mode may include the display scan period, and the second mode may include the self-scan period. In an embodiment, the first mode may refer to a case where the display device 100 is driven at a high frequency (e.g., a high frequency driving mode) equal to or higher than a reference frequency. The second mode may refer to a case where the display device 100 is driven at a low frequency (e.g., a low frequency driving mode) lower than the reference frequency. The reference frequency may be experimentally determined corresponding to an inch, a resolution, and the like of the pixel unit 100. In an example, the reference frequency may have (e.g., may be set as) a frequency of 10 Hz to 100 Hz.

The first emission driver 140 may be driven according to a first emission driving control signal ECS1 supplied from the timing controller 120. As an example, the first emission driver 140 may supply a disable emission control signal to the emission control lines EL1 to ELn when the display device 100 is driven in the first mode. For example, the first emission driver 140 may sequentially supply the disable emission control signal to the emission control lines EL1 to ELn.

In an embodiment, the first emission driver 140 may supply at least one disable emission control signal to each of the emission control lines EL1 to ELn during a display scan period of one frame. In an embodiment, the first emission driver 140 may supply at least one disable emission control signal to each of the emission control lines EL1 to ELn when the display device 100 is driven at a high frequency.

The second emission driver 150 may be driven according to a second emission driving control signal ECS2 supplied from the timing controller 120. As an example, the second emission driver 150 may supply a disable emission control signal to the emission control lines EL1 to ELn when the display device 100 is driven in the second mode. For example, the second emission driver 150 may sequentially supply the disable emission control signal to the emission control lines EL1 to ELn.

In an embodiment, the second emission driver 150 may supply at least one disable emission control signal to each of the emission control lines EL1 to ELn during a self-scan period of one frame. When the image refresh rate is decreased (e.g., when the frame length is lengthened), a number of times an operation, in which the second emission driver 150 supplies the disable emission control signal to each of the emission control lines EL1 to ELn in one frame period, is repeated may be increased. In an embodiment, the second emission driver 150 may supply at least one disable emission control signal to each of the emission control lines EL1 to ELn when the display device 100 is driven at a low frequency.

The data driver 170 may receive a data driving control signal DCS and output data Dout from the timing controller 120. The data driving signal DCS may include a sampling signal and/or timing signals used for driving of the data driver 170. The data driver 170 may generate a data signal based on the data driving signal DCS and the output data Dout. As an example, the data driver 170 may generate an analog data signal based on a grayscale (e.g., a grayscale value) of the output data Dout. The data driver 170 may supply the data signal to the data lines DL1 to DLm to be synchronized with the enable second scan signal.

The timing controller 120 may receive input data Din and a control signal CS from a host system through an interface. As an example, the timing controller 120 may receive the input data Din and the control signal CS from at least one of a Graphics Processing Unit (GPU), a Central Processing Unit (CPU), and/or an Application Processor (AP), which are included in the host system. Various signals including a clock signal may be included in the control signal CS.

The timing controller 120 may generate the first driving control signal SCS1, the second driving control signal SCS2, the first emission driving control signal ECS1, the second emission driving control signal ECS2, and the data driving control signal DCS based on the control signal CS. The first driving control signal SCS1, the second driving control signal SCS2, the first emission driving control signal ECS1, the second emission driving control signal ECS2, and the data driving control signal DCS may be supplied to the first driver 130, the second driver 160, the first emission driver 140, the second emission driver 150, and the data driver 170, respectively.

The timing controller 120 may align or realign the input data Din to be suitable for a specification of the display device 100. Also, the timing controller 120 may generate the output data Dout by correcting the input data Din, and may supply the output data Dout to the data driver 140. In an embodiment, the timing controller 120 may correct the input data Din according to an optical measurement result measured in a processing process.

The power supply 180 may generate various power sources used for driving of the display device 100. As an example, the power supply 180 may generate a first driving power source VDD, a second driving power source VSS, an initialization power source Vint, and a bias power source Vbias.

The first driving power source VDD may be a power source that supplies a driving current to the pixels PX. The second driving power source VSS may be a power source that is supplied with the driving current from the pixels PX. The first driving power source VDD may have (e.g., may be set to) a voltage higher than a voltage of the second driving power source VSS during a period in which the pixels PX emit light (e.g., are set to be in an emission state).

The initialization power source Vint may be a power source for initializing a gate electrode of a driving transistor (e.g., a first transistor M1 shown in FIG. 3A) included in each of the pixels PX and a first electrode of a light emitting element (e.g., a light emitting element LD shown in FIG. 3A) included in each of the pixels PX. The initialization power source Vint may have (e.g., may be set to) a voltage lower than a voltage of the data signal. The bias power source Vbias may be a power source for applying an on-bias voltage or an off-bias voltage to the driving transistor included in each of the pixels PX.

The first driving power source VDD generated by the power supply 180 may be supplied to a first power line PL1. The second driving power source VSS generated by the power supply 180 may be supplied to a second power line PL2. The initialization power source Vint generated by the power supply 180 may be supplied to a third power line PL3. The bias power source Vbias generated by the power supply 180 may be supplied to a fourth power line PL4. The first power line PL1, the second power line PL2, the third power line PL3, and the fourth power line PL4 may be commonly connected to the pixels PX, but the present disclosure is not limited thereto.

In an embodiment, the first power line PL1 may include a plurality of power lines, and the plurality of power lines may be connected to different pixels PX. In an embodiment, the second power line PL2 may include a plurality of power lines, and the plurality of power lines may be connected to different pixels PX. In an embodiment, the third power line PL3 may include a plurality of power lines, and the plurality of power lines may be connected to different pixels PX. In an embodiment, the fourth power line PL4 may include a plurality of power lines, and the plurality of power lines may be connected to different pixels PX. In other words, in an embodiment of the present disclosure, each of the pixels PX may be connected to any one of the plurality of power lines of the first power line PL1, any one of the plurality of power lines of the second power line PL2, any one of the plurality of power lines of the third power line PL3, and any one of the plurality of power lines of the fourth power line PL4.

In an embodiment of the present disclosure, the display device 100 may include a flat or substantially flat display device, a curved display device in which a portion of the pixel unit 110 is curved, a flexible display device in which a portion of the pixel unit 110 is folded or bent, and/or a stretchable display device in which a portion of the pixel unit 110 is expanded/contracted.

In an embodiment of the present disclosure, the display device is a device that displays moving images and/or still images, and may include various suitable portable electronic devices, such as a mobile phone, a smartphone, a tablet personal computer (PC), a smart watch, a watch phone, a portable multimedia player (PMP), a navigation system, and an ultra mobile computer (UMPC). In an embodiment of the present disclosure, the display device 100 may include various suitable electronic devices, such as a television, a notebook computer, a monitor, an advertisement board, and an Internet of things (IOT) device.

Figure 2:
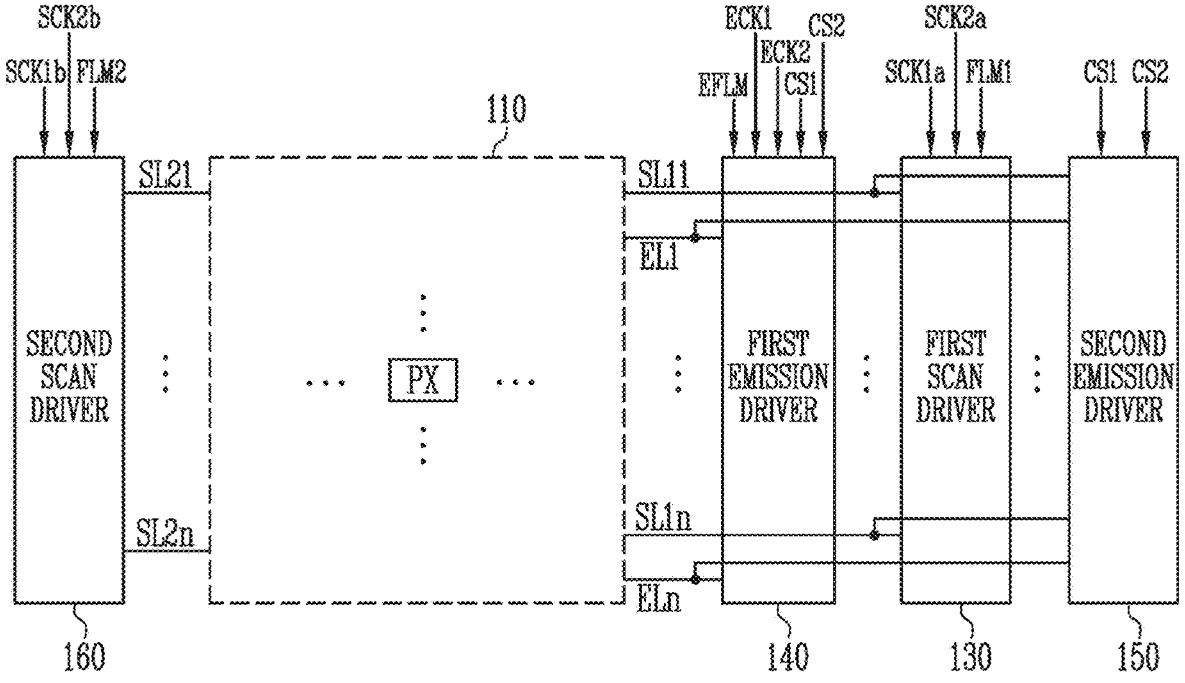
FIG. 2 is a diagram illustrating an embodiment of scan drivers and emission drivers shown in FIG. 1.

FIG. 2 is a diagram illustrating an embodiment of the scan drivers and the emission drivers shown in FIG. 1.

Referring to FIG. 2, the first scan driver 130 may be driven corresponding to the first driving control signal SCS1 supplied from the timing controller 120. Scan clock signals SCK1*a* and SCK2*a* and a scan start signal FLM1 may be included in the first driving control signal SCS1. The first scan driver 130 may generate an enable first scan signal while shifting the scan start signal FLM1 according to the scan clock signals SCK1*a* and SCK2*a*. The first scan driver 130 may sequentially supply the enable first scan signal to the first scan lines SL11 to SL1*n*.

The second scan driver 160 may be driven corresponding to the second driving control signal SCS2 supplied from the timing controller 120. Scan clock signals SCK1*b* and SCK2*b* and a scan start signal FLM2 may be included in the second driving control signal SCS2. The second scan driver 160 may generate an enable second scan signal while shifting the scan start signal FLM2 according to the scan clock signals SCK1*b* and SCK2*b*. The second scan driver 160 may sequentially supply the enable second scan signal to the second scan lines SL21 to SL2*n*.

Additionally, the second scan lines SL21 to SL2*n* may include a plurality of scan lines for each horizontal line. The second scan driver 160 may include a plurality of scan drivers, and may further receive scan clock signals and scan start signals, which correspond to the plurality of scan drivers, from the timing controller 120.

The emission drivers 140 and 150 may be supplied with a first control signal CS1 and a second control signal CS2. Each of the first control signal CS1 and the second control signal CS2 may have a voltage level corresponding to the driving mode of the display device 100.

In an embodiment, a high-level first control signal CS1 and a low-level second control signal CS2 may be supplied when the display device 100 is driven in the first mode. The first emission driver 140 may be driven when the high-level first control signal CS1 and the low-level second control signal CS2 are supplied from the timing controller 120.

In an embodiment, a low-level first control signal CS1 and a high-level second control signal CS2 may be supplied when the display device 100 is driven in the second mode. The second emission driver 150 may be driven when the low-level first control signal CS1 and the high-level second control signal CS2 are supplied from the timing controller 120.

The first emission driver 140 may generate a disable emission control signal while shifting an emission start signal EFLM according to emission clock signals ECK1 and ECK2, when the high-level first control signal CS1 and the low-level second control signal CS2 are supplied. The first emission driver 140 may sequentially supply the disable emission control signal to the emission control lines EL1 to ELn.

The second emission driver 150 may generate a disable emission control signal according to the enable first scan signal, when the low-level first control signal CS1 and the high-level second control signal CS2 are supplied. The second emission driver 150 may sequentially supply the disable emission control signal to the emission control lines EL1 to ELn.

In an embodiment, the second emission driver 150 may generate a disable emission control signal according to the enable first scan signal sequentially supplied from the first scan driver 130, without being supplied with a separate clock signal. This will be described in more detail below.

Figure 3B:
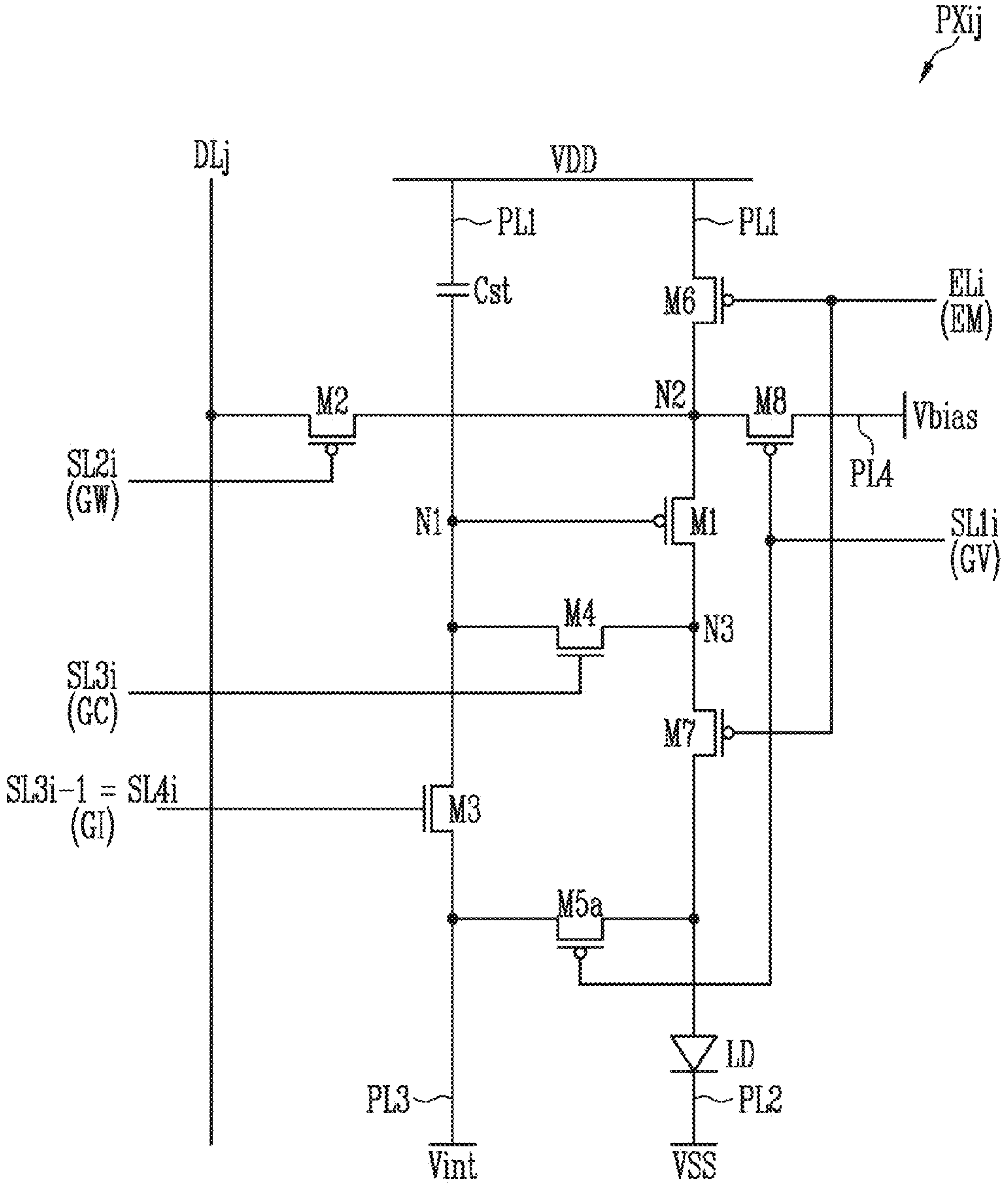
Figure 3C:
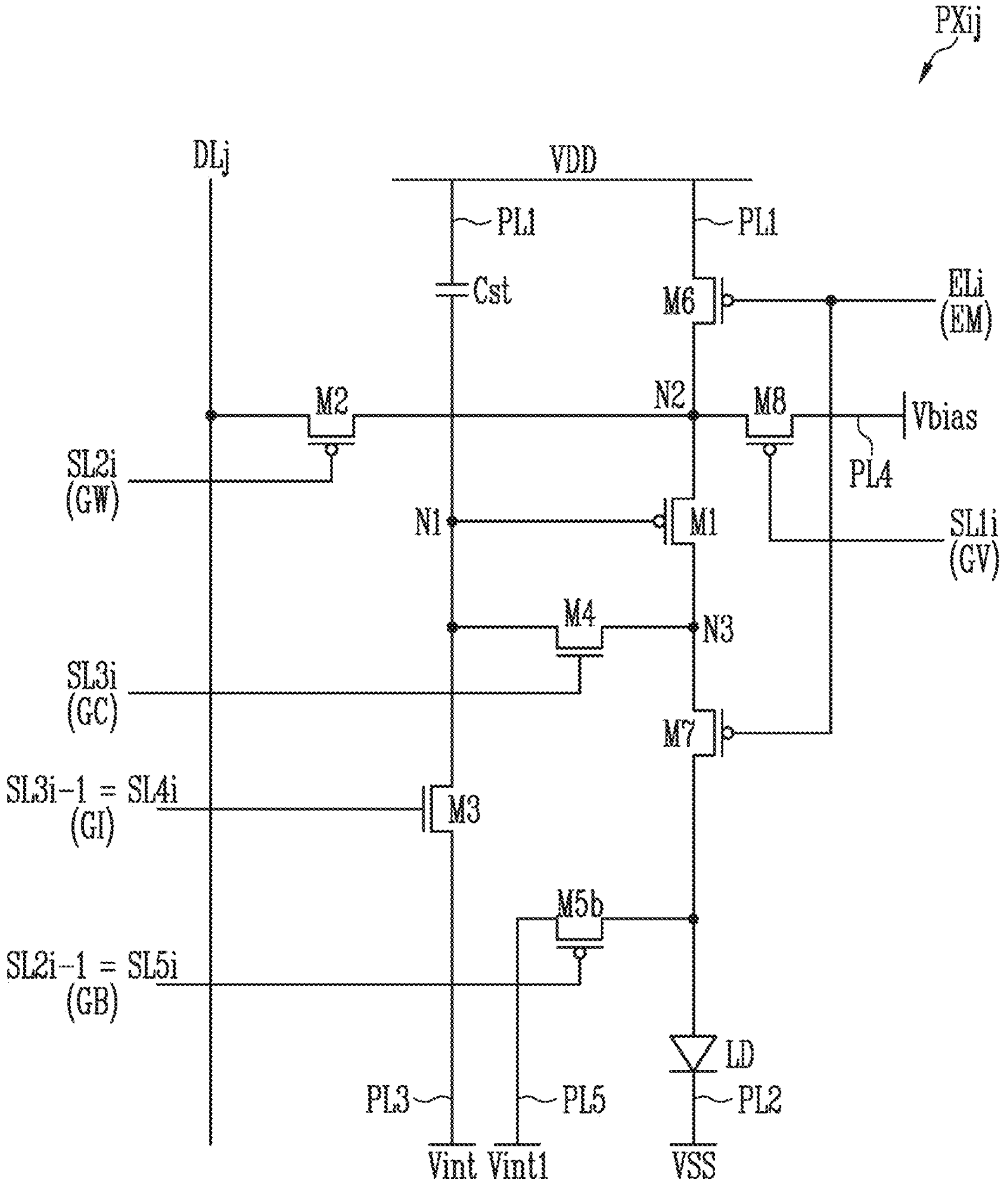

FIGS. 3A through 3C are diagrams illustrating one or more embodiments of the pixel shown in FIG. 1. A pixel PXij located on an ith horizontal line and a jth vertical line will be described in more detail hereinafter with reference to FIGS. 3A to 3C.

Referring to FIG. 3A, the pixel PXij in accordance with an embodiment of the present disclosure may be connected to corresponding signal lines SL1*i*, SL2*i*, SL3*i*, SL4*i*, and SL5*i*. For example, the pixel PXij may be connected to an ith first scan line SL1*i*, an ith second scan line SL2*i*, an ith third scan line SL3*i*, an ith fourth scan line SL4*i*, an ith fifth scan line SL5*i*, an ith emission control line ELi, and a jth data line DLj. In an embodiment, the pixel PXij may be further connected to the first power line PL1, the second power line PL2, the third power line PL3, and the fourth power line PL4.

The ith second scan line SL2*i*, the ith third scan line SL3*i*, the ith fourth scan line SL4*i*, and the ith fifth scan line SL5*i* may be sorted as a second scan line SL2, and be driven by the second driver 160. The ith fourth scan line SL4*i* may be (e.g., may be set as) an (i−1)th third scan line SL3*i*−1 of a previous horizontal line, and the ith fifth scan line SL5*i* may be an (i−1)th second scan line SL2*i*−1. A second scan line and a third scan line may be located for each horizontal line, and the second driver 160 may drive the second scan line and the third scan line.

The pixel PXij in accordance with an embodiment of the present disclosure may include a light emitting element LD, and a pixel circuit for controlling an amount of current supplied to the light emitting element LD.

The light emitting element LD may be connected between the first power line PL1 and the second power line PL2. As an example, a first electrode (e.g., an anode electrode) of the light emitting element LD may be electrically connected to the first power line PL1 via a seventh transistor M7, a third node N3, a first transistor M1, a second node N2, and a sixth transistor M6. A second electrode (e.g., a cathode electrode) of the light emitting element LD may be electrically connected to the second power line PL2. The light emitting element LD may generate light having a desired luminance (e.g., a predetermined luminance) according to an amount of current supplied from the first power line PL1 to the second power line PL2 via the pixel circuit.

The light emitting element LD may be selected as an organic light emitting diode. Also, the light emitting element LD may be selected as an inorganic light emitting diode, such as a micro LED (light emitting diode) or a quantum dot light emitting diode. Also, the light emitting element LD may be an element configured with a combination of an organic material and an inorganic material. FIG. 3A shows that the pixel PXij includes a single light emitting element LD. However, the present disclosure is not limited thereto. For example, in another embodiment, the pixel PXij may include a plurality of light emitting elements LD, and the plurality of light emitting elements LD may be connected in series, in parallel, or in series/parallel to each other.

The pixel circuit may include the first transistor M1, a second transistor M2, a third transistor M3, a fourth transistor M4, a fifth transistor M5, the sixth transistor M6, the seventh transistor M7, an eighth transistor M8, and a storage capacitor Cst.

A first electrode of the first transistor M1 (e.g., a driving transistor) may be connected to the second node N2, and a second electrode of the first transistor M1 may be connected to the third node N3. A gate electrode of the first transistor M1 may be connected to a first node N1. The first transistor M1 may control an amount of current supplied from the first driving power source VDD to the second driving power source VSS via the light emitting element LD according to a voltage of the first node N1.

The second transistor M2 may be connected between the data line DLj and the second node N2. A gate electrode of the second transistor M2 may be electrically connected to the second scan line SL2*i*. The second transistor M2 may be turned on when an enable second scan signal GW is supplied to the second scan line SL2*i*, and may electrically connect the data line DLj and the second node N2 to each other.

A first electrode of the third transistor M3 may be connected to the first node N1, and a second electrode of the third transistor M3 may be electrically connected to the third power line PL3. A gate electrode of the third transistor M3 may be electrically connected to the fourth scan line SL4*i*. The third transistor M3 may be turned on when an enable fourth scan signal GI is supplied to the fourth scan line SL4*i*, and may supply a voltage of the initialization power source Vint to the first node N1.

The fourth transistor M4 may be connected between the first node N1 and the third node N3. A gate electrode of the fourth transistor M4 may be electrically connected to the third scan line SL3*i*. The fourth transistor M4 may be turned on when an enable third scan signal GC is supplied to the third scan line SL3*i*, and may electrically connect the first node N1 and the third node N3 to each other. In other words, when the fourth transistor M4 is turned on, the first transistor M1 may be connected in a diode form (e.g., may be diode-connected).

A first electrode of the fifth transistor M5 may be electrically connected to the first electrode of the light emitting element LD, and a second electrode of the fifth transistor M5 may be electrically connected to the third power line PL3. A gate electrode of the fifth transistor M5 may be electrically connected to the fifth scan line SL5*i*. The fifth transistor M5 may be turned on when an enable fifth scan signal GB is supplied to the fifth scan line SL5*i*, and may supply the voltage of the initialization power source Vint to the first electrode of the light emitting element LD.

When the voltage of the initialization power source Vint is supplied to the first electrode of the light emitting element LD, a parasitic capacitor of the light emitting element LD may be discharged. Because a residual voltage charged in the parasitic capacitor of the light emitting element LD may be discharged (e.g., may be removed), an unintended minute emission may be prevented or substantially prevented. Thus, a black expression ability of the pixel PXij may be improved.

A first electrode of the sixth transistor M6 may be electrically connected to the first power line PL1, and a second electrode of the sixth transistor M6 may be connected to the second node N2. A gate electrode of the sixth transistor M6 may be electrically connected to the emission control line ELi. The sixth transistor M6 may be turned off when a disable emission control signal EM is supplied to the emission control line ELi, and may be turned on when an enable emission control signal EM is supplied to the emission control line ELi.

The seventh transistor M7 may be connected between the third node N3 and the first electrode of the light emitting element LD. In addition, a gate electrode of the seventh transistor M7 may be electrically connected to the emission control line ELi. The seventh transistor M7 may be turned off when the disable emission control signal EM is supplied to the emission control line ELi, and may be turned on when the enable emission control signal EM is supplied to the emission control line ELi.

A first electrode of the eighth transistor M8 (e.g., a bias transistor) may be electrically connected to the fourth power line PL4, and a second electrode of the eighth transistor M8 may be connected to the second node N2. A gate electrode of the eighth transistor M8 may be electrically connected to the first scan line SL1*i*. The eighth transistor M8 may be turned on when an enable first scan signal GV is supplied to the first scan line SL1*i*, and may electrically connect the fourth power line PL4 and the second node N2 to each other.

The storage capacitor Cst may be connected between the first power line PL1 and the first node N1. The storage capacitor Cst may store a voltage applied to the first node N1.

In an embodiment, the first transistor M1, the second transistor M2, the fifth transistor M5, the sixth transistor M6, the seventh transistor M7, and the eighth transistor M8 may be implemented with poly-silicon semiconductor transistors. For example, the first transistor M1, the second transistor M2, the fifth transistor M5, the sixth transistor M6, the seventh transistor M7, and the eighth transistor M8 may include a poly-silicon semiconductor layer formed as an active layer (e.g., a channel) through a low temperature poly-silicon (LTPS) process. In addition, the first transistor M1, the second transistor M2, the fifth transistor M5, the sixth transistor M6, the seventh transistor M7, and the eighth transistor M8 may be implemented as a P-type transistor (e.g., a PMOS transistor). Accordingly, a gate-on voltage at which the first transistor M1, the second transistor M2, the fifth transistor M5, the sixth transistor M6, the seventh transistor M7, and the eighth transistor M8 are turned on may have a logic low level. Because the poly-silicon semiconductor transistor may have high response speeds, the poly-silicon semiconductor transistor may be applied to a switching element that uses fast switching.

In an embodiment, the third transistor M3 and the fourth transistor M4 may be formed with oxide semiconductor transistors. For example, the third transistor M3 and the fourth transistor M4 may be implemented with an N-type oxide semiconductor transistor (e.g., an NMOS transistor), and may include an oxide semiconductor layer as an active layer. Accordingly, a gate-on voltage at which the third transistor M3 and the fourth transistor M4 are turned on may have a logic high level.

The oxide semiconductor transistor may be formed through a low temperature process, and may have a charge mobility lower than a charge mobility of the poly-silicon semiconductor transistor. In other words, the oxide semiconductor transistor may have excellent off-current characteristics. Thus, when the third transistor M3 and the fourth transistor M4 are implemented with the oxide semiconductor transistor, a leakage current from the first node N1 according to low frequency driving may be minimized or reduced, and accordingly, a display quality may be improved.

Referring to FIG. 3B, in an embodiment of the present disclosure, a gate electrode of a fifth transistor M5*a* may be connected to the first scan line SL1*i*. The fifth transistor M5*a* may be turned on when the enable first scan signal GV is supplied from the first scan line SL1*i*, and may supply the voltage of the initialization power source Vint to the first electrode of the light emitting element LD.

Referring to FIG. 3C, in an embodiment of the present disclosure, a fifth transistor M5*b* may be connected to a fifth power line PL5 to which a voltage of a first initialization power source Vint1 is supplied and the first electrode of the light emitting element LD. In addition, a gate electrode of the fifth transistor M5*b* may be electrically connected to the fifth scan line SL5*i*. The fifth transistor M5*b* may be turned on when the enable fifth scan signal GB is supplied to the fifth scan line SL5*i*, and may supply the voltage of the first initialization power source Vint1 to the first electrode of the light emitting element LD.

The initialization power source Vint may have (e.g., may be set to) a voltage different from the voltage of the first initialization power source Vint1. For example, the initialization power source Vint may have (e.g., may be set to) a voltage capable of stably initializing the first node N1, and the first initialization power source Vint1 may have (e.g., may be set to) a voltage capable of stably initializing the light emitting element LD.

Figure 4:
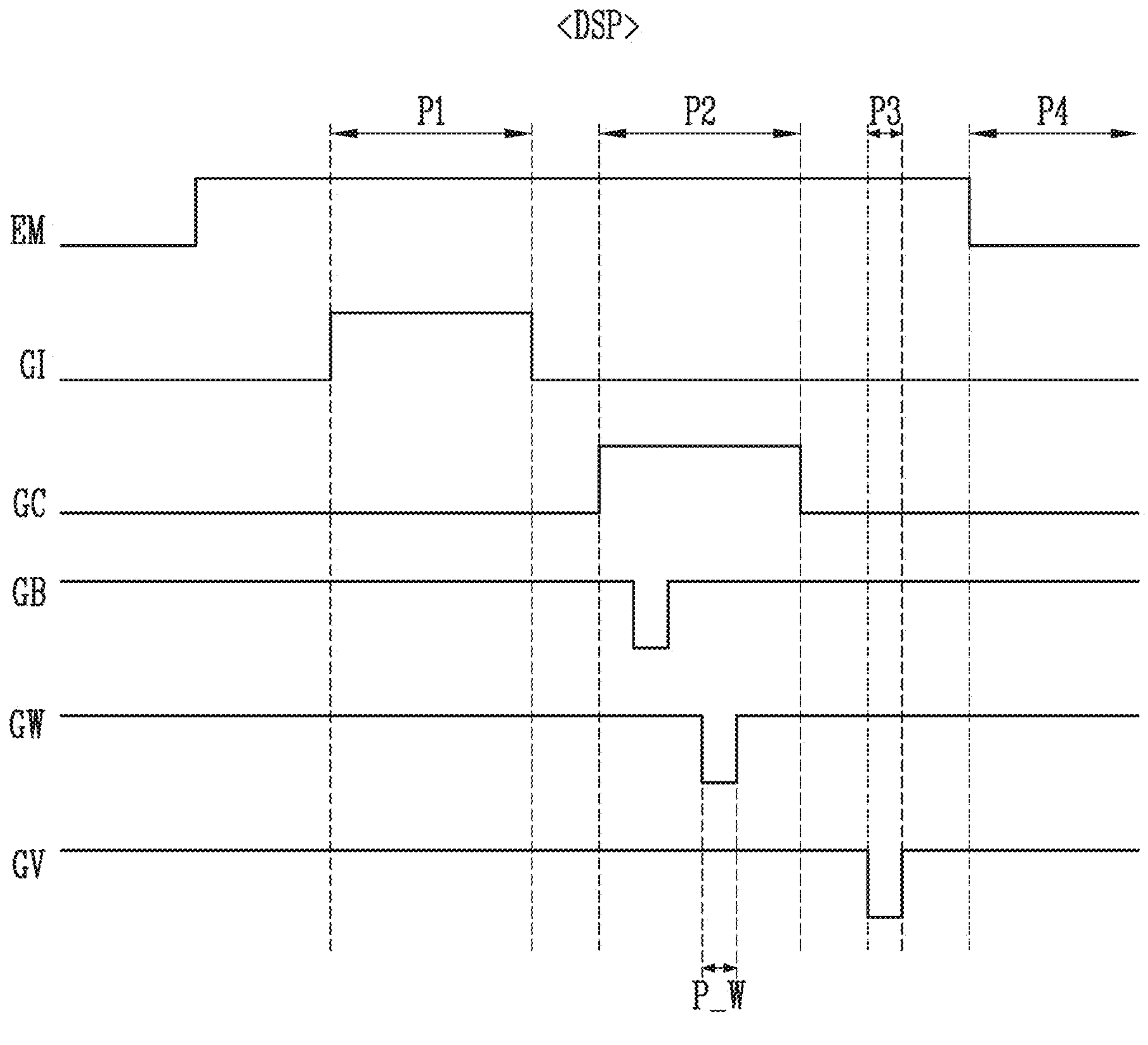
FIG. 4 is a waveform diagram illustrating an embodiment of a display scan period of a method of driving a pixel shown in FIG. 3A.

FIG. 4 is a waveform diagram illustrating an embodiment of a display scan period of a method of driving the pixel shown in FIG. 3A.

Referring to FIGS. 3A and 4, the display scan period DSP may include a first period P1, a second period P2, a third period P3, and a fourth period P4. The first period P1 to the third period P3 may be a non-emission period, and the fourth period P4 may be an emission period.

During the first period P1 to the third period P3, a disable emission control signal EM may be supplied to the emission control line ELi. When the disable emission control signal EM is supplied to the emission control line ELi, the sixth transistor M6 and the seventh transistor M7 may be turned off. When the sixth transistor M6 and the seventh transistor M7 are turned off, an electric connection between the first power line PL1 and the light emitting element LD may be blocked, and accordingly, the light emitting element LD may be (e.g., may be set to be) in a non-emission state.

In the first period P1, the enable fourth scan signal GI may be supplied to the fourth scan line SL4*i*. When the enable fourth scan signal GI is supplied to the fourth scan line SL4*i*, the third transistor M3 may be turned on. When the third transistor M3 is turned on, the voltage of the initialization power source Vint of the third power line PL3 may be supplied to the first node N1.

In the second period P2, the enable third scan signal GC may be supplied to the third scan line SL3*i*. When the enable third scan signal GC is supplied to the third scan line SL3*i*, the fourth transistor M4 may be turned on. When the fourth transistor M4 is turned on, the first transistor M1 may be diode-connected.

In a writing period P_W overlapping with the second period P2, the enable second scan signal GW may be supplied to the second scan line SL2*i*. When the enable second scan signal GW is supplied to the second scan line SL2*i*, the second transistor M2 may be turned on. When the second transistor M2 is turned on, a data signal from the data line DLj may be supplied to the second node N2. Because the first transistor M1 may be maintained in a diode-connected form by the turned-on fourth transistor M4, the first node N1 may have a voltage obtained by compensating for the threshold voltage of the first transistor M1 in the data signal.

Before the writing period P_W, the enable fifth scan signal GB may be supplied to the fifth scan line SL5*i*. When the enable fifth scan signal GB is supplied to the fifth scan line SL5*i*, the fifth transistor M5 may be turned on. When the fifth transistor M5 is turned on, the voltage of the initialization power source Vint may be supplied to the first electrode of the light emitting element LD.

In the third period P3, the enable first scan signal GV may be supplied to the first scan line SL1*i*. When the enable first scan signal GV is supplied to the first scan line SL1*i*, the eighth transistor M8 may be turned on. When the eighth transistor M8 is turned on, the bias voltage Vbias may be supplied to the second node N2. The first transistor M1 may be initialized by the bias voltage Vbias to be in an on-bias state or an off-base state.

In the fourth period P4, because an enable emission control signal EM (e.g., a low-level emission control signal) is supplied to the emission control line ELi, the sixth transistor M6 and the seventh transistor M7 may be turned on. When the sixth transistor M6 and the seventh transistor M7 are turned on, a current flowing path may be formed from the first power line PL1 to the second power line PL2 via the sixth transistor M6, the first transistor M1, the seventh transistor M7, and the light emitting element LD. A driving current corresponding to the voltage of the first node N1 may flow through the light emitting element LD according to an operation of the first transistor M1, and the light emitting element LD may emit light having a luminance corresponding to the driving current.

Figure 5:
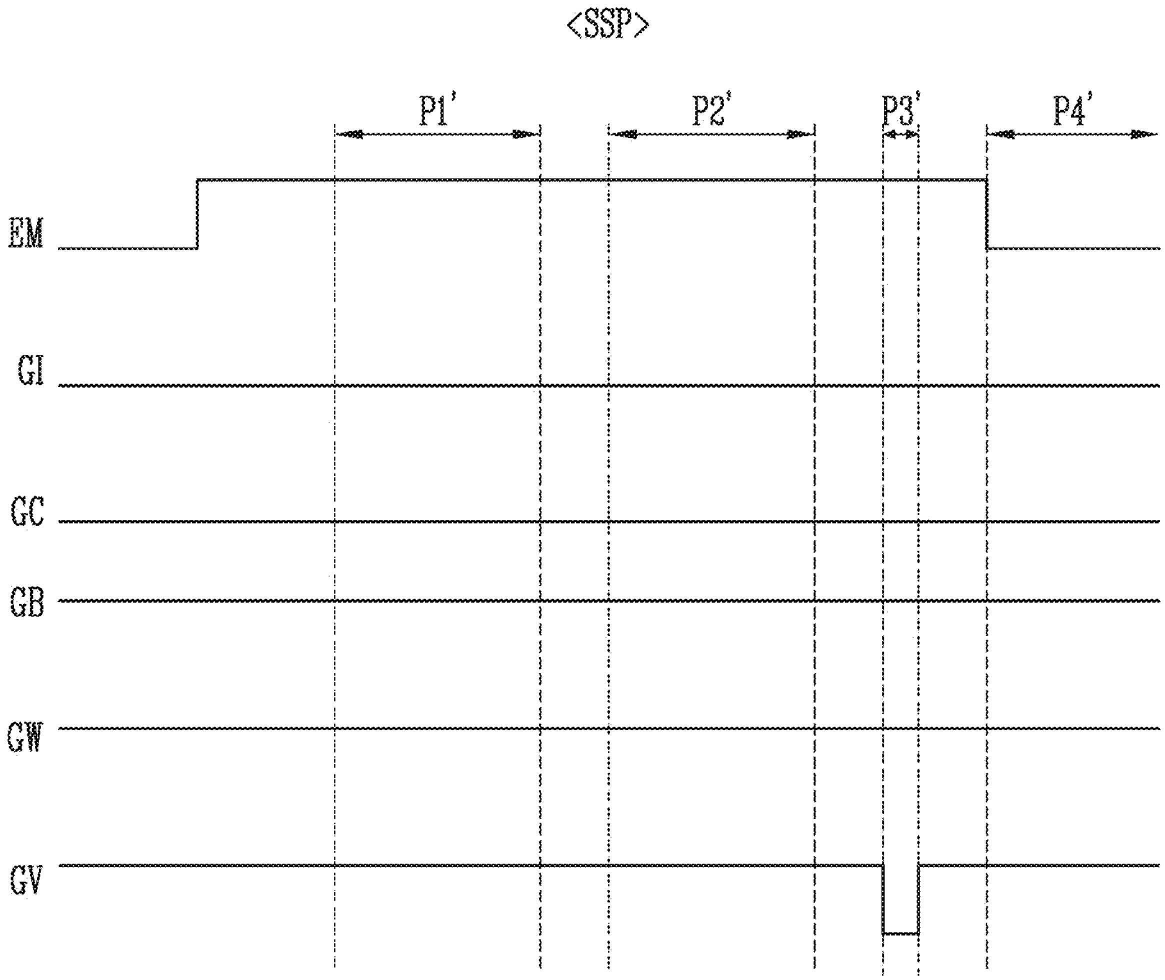
FIG. 5 is a waveform diagram illustrating an embodiment of a self-scan period of the method of driving the pixel shown in FIG. 3A.

FIG. 5 is a waveform diagram illustrating an embodiment of a self-scan period of the method of driving the pixel shown in FIG. 3A. The self-scan period SSP may be a period in which light is emitted while maintaining or substantially maintaining the voltage of a previously supplied data signal, and may be a period in which an image is re-displayed without changing any frame. In an embodiment, one frame may include one display scan period DSP and one or more self-scan periods SSP. The one or more self-scan periods SSP may be successively disposed after the display scan period DSP.

When compared with the display scan period DSP, in the self-scan period SSP, a threshold voltage compensation operation and a data writing operation may be omitted, and an operation of applying a bias voltage to the first transistor M1 and a light emitting operation may be performed. Additionally, when the first scan line SL1*i* is connected to the fifth transistor M5*a* as shown in FIG. 3B, an operation of initializing the light emitting element LD may be performed. The self-scan period SSP may have (e.g., may be set to have) a length equal to a length of the display scan period DSP. The self-scan period SSP may include a first period P1', a second period P2', a third period P3', and a fourth period P4'.

Referring to FIGS. 3A and 5, in the first period P1' to the third period P3', the disable emission control signal EM may be supplied to the emission control line ELi. When the disable emission control signal EM is supplied to the emission control line ELi, the sixth transistor M6 and the seventh transistor M7 may be turned off, and accordingly, the light emitting element LD may be (e.g., may be set to be) in the non-emission state.

In the first period P1' to the third period P3', the enable second scan signal GW, the enable fourth scan signal GI, and the enable fifth scan signal GB may not be supplied. Accordingly, in the first period P1' to the third period P3', the second transistor M2, the third transistor M3, the fourth transistor M4, and the fifth transistor M5 may be (e.g., may be set to be) in the turn-off state.

In the third period P3', the enable first scan signal GV may be supplied to the first scan line SL1*i*. When the enable first scan signal GV is supplied to the first scan line SL1*i*, the eighth transistor M8 may be turned on. When the eighth transistor M8 is turned on, the bias voltage Vbias may be supplied to the second node N2. The first transistor M1 may be initialized by the bias voltage Vbias to be in the on-bias state or the off-base state.

In some embodiments, when the fifth transistor M5*a* is connected to the first scan line SL1*i* as shown in FIG. 3B, the fifth transistor M5*a* may be turned on during the third period P3'. When the fifth transistor M5*a* is turned on, the voltage of the initialization power source Vint may be supplied to the first electrode of the light emitting element LD.

In the fourth period P4', because the enable emission control signal EM is supplied to the emission control line ELi, the sixth transistor M6 and the seventh transistor M7 may be turned on. A driving current corresponding to the voltage of the first node N1 may flow through the light emitting element LD according to an operation of the first transistor M1, and the light emitting element LD may emit light having a luminance corresponding to the driving current.

Because the one frame includes the display scan period DSP and the self-scan period SSP, the display device 100 in accordance with an embodiment of the present disclosure may be driven at various suitable driving frequencies (e.g., various suitable frame frequencies).

Figure 6:
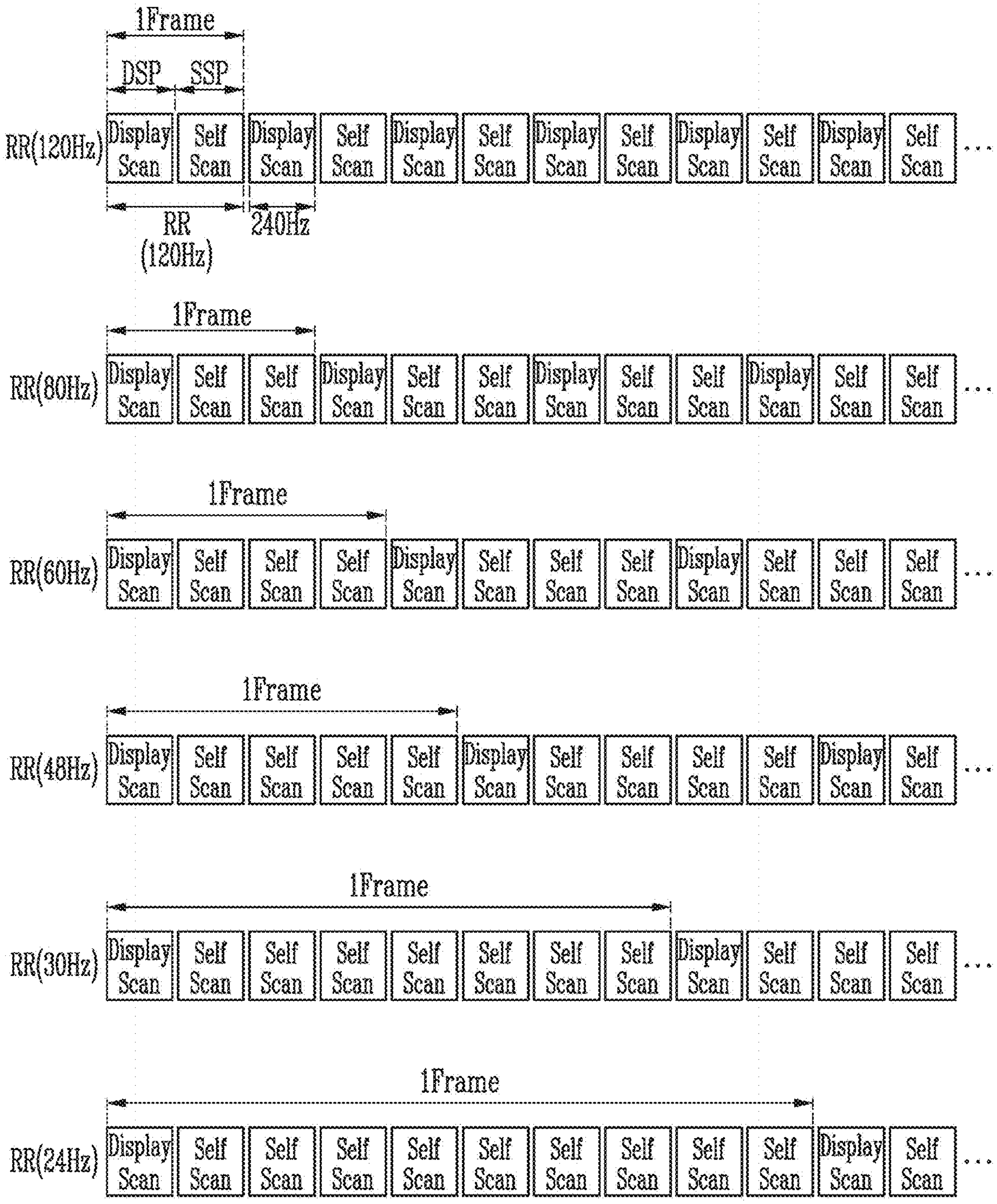
FIG. 6 is a schematic diagram illustrating a display method according to an image refresh rate.

FIG. 6 is a schematic diagram illustrating a display method according to an image refresh rate.

Referring to FIG. 6, one frame (1 Frame) may include an active period and a blank period. The active period may be a period in which a data signal is supplied, and may include the display scan period DSP. The blank period may be a period in which the light emitting element LD emits light while the data signal supplied in the active period is maintained, and may include the self-scan period SSP.

The active period may have (e.g., may be set to have) the same length regardless of an image refresh rate RR, and the blank period may have (e.g., may be set to have) different lengths according to the image refresh rate RR. As an example, as the image refresh rate RR decreases (e.g., as the image refresh rate RR approaches a low frequency), the blank period may be lengthened (e.g., a length of the blank period may be increased). As the image refresh rate RR decreases, the number of self-scan periods SSP included in the blank period may be increased.

In an embodiment, the display scan period DSP and the self-scan period SSP may have the same or substantially the same length as each other. However, the number of self-scan periods SSP included in one frame period may be determined according to the image refresh rate RR.

As shown in FIG. 6, when the display device 100 is driven at an image refresh rate RR of 120 Hz, one frame period may include one display scan period DSP and one self-scan period SSP. Accordingly, when the display device 100 is driven at the image refresh rate RR of 120 Hz, an emission and a non-emission of each of the pixels PX may be alternately repeated twice during the one frame period.

When the display device 100 is driven at an image refresh rate RR of 80 Hz, one frame period may include one display scan period DSP and two self-scan periods SSP. Accordingly, when the display device 100 is driven at the image refresh rate RR of 80 Hz, an emission and a non-emission of each of the pixels PX may be alternately repeated three times during the one frame period.

In a similar manner, the display device 100 may be driven at a driving frequency of 60 Hz, 48 Hz, 30 Hz, 24 Hz, 1 Hz, or the like by adjusting the number of self-scan periods SSP included in one frame period.

In other words, in an embodiment of the present disclosure, the number of self-scan periods SSP included in one frame may be increased as the driving frequency decreases, so that the light emitting element LD and the first transistor M1, which are included in each of the pixels PX, may be initialized for every certain period. Accordingly, the pixel PX may have a uniform or substantially uniform luminance characteristic.

Figure 7:
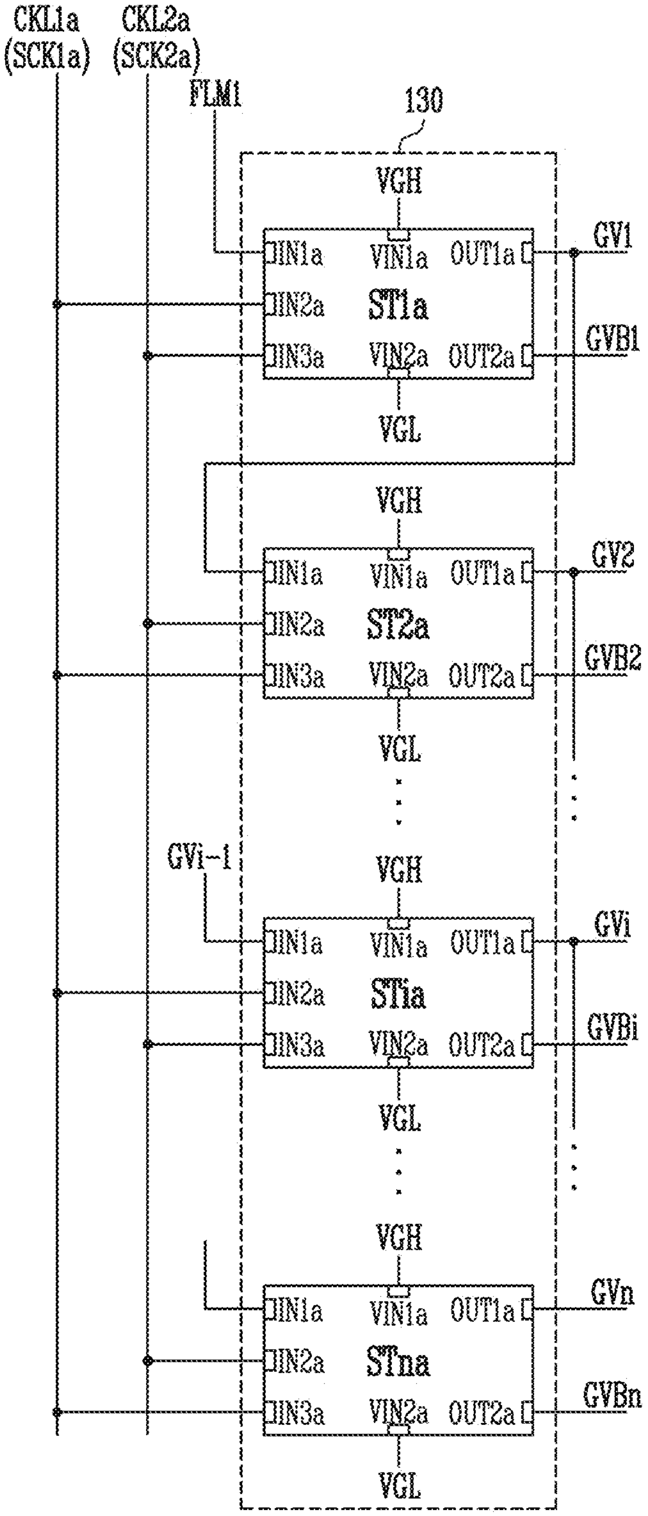
FIG. 7 is a diagram illustrating an embodiment of a first scan driver shown in FIG. 1.

FIG. 7 is a diagram illustrating an embodiment of the first scan driver shown in FIG. 1.

Referring to FIG. 7, the first scan driver 130 in accordance with an embodiment of the present disclosure may include a plurality of stage circuits ST1*a*, ST2*a*, . . . , STia, . . . , and STna (where n is a natural number of two or more).

Each of the stage circuits ST1*a* to STna may include a first input terminal IN1*a*, a second input terminal IN2*a*, a third input terminal IN3*a*, a first power input terminal VIN1*a*, a second power input terminal VIN2*a*, a first output terminal OUT1*a*, and a second output terminal OUT2*a*.

A start signal FLM1 may be supplied to the first input terminal IN1*a* of a first stage circuit ST1*a*. A first scan signal GV (e.g., an enable first scan signal) of a previous stage circuit may be input to the first input terminal IN1*a* of each of the other remaining stage circuits ST2*a* to STna, except for the first stage circuit ST1*a*. As an example, a first scan signal GVi−1 of an (i−1)th stage circuit may be input to the first input terminal IN1*a* of an ith stage circuit STia.

The stage circuits ST1*a* to STna may be connected to a first clock line CLK1*a* and a second clock line CLK2*a*. As an example, the second input terminal IN2*a* of each of odd-numbered stage circuits ST1*a*, . . . , and STia may be connected to the first clock line CLK1*a* to which a first scan clock signal SCK1*a* is input, and the third input terminal IN3*a* of each of the odd-numbered stage circuits ST1*a*, . . . , and STia may be connected to the second clock line CLK2*a* to which a second scan clock signal SCK2*a* is input. In addition, the second input terminal IN2*a* of each of even-numbered stage circuits ST2*a*, . . . , and STna may be connected to the second clock line CLK2*a*, and the third input terminal IN3*a* of each of the even-numbered stage circuits ST2*a*, . . . , and STna may be connected to the first clock line CLK1*a*.

A first scan signal GV may be output to the first output terminal OUT1*a* of each of the stage circuits ST1*a* to STna. An inverted first scan signal GVB may be output to the second output terminal OUT2*a* of each of the stage circuits ST1*a* to STna. As an example, an ith first scan signal GVi may be output to the first output terminal OUT1*a* of the ith stage circuit STia, and an inverted ith first scan signal GVBi may be output to the second output terminal OUT2*a* of the ith stage circuit STia.

A first power source VGH may be input to the first power input terminal VIN1*a* of each of the stage circuits ST1*a* to STna, and a second power source VGL may be input to the second power input terminal VIN2*a* of each of the stage circuits ST1*a* to STna. The first power source VGH may have (e.g., may be set to) a logic high level voltage, and the second power source VGL may have (e.g., may be set to) a logic low level voltage lower than the logic high level voltage of the first power source VGH.

A plurality of dummy stages may be further provided in the first scan driver 130. The dummy stages may be located as a previous stage of the first stage circuit ST1*a* and a next stage of the nth stage circuit STna.

Figure 8:
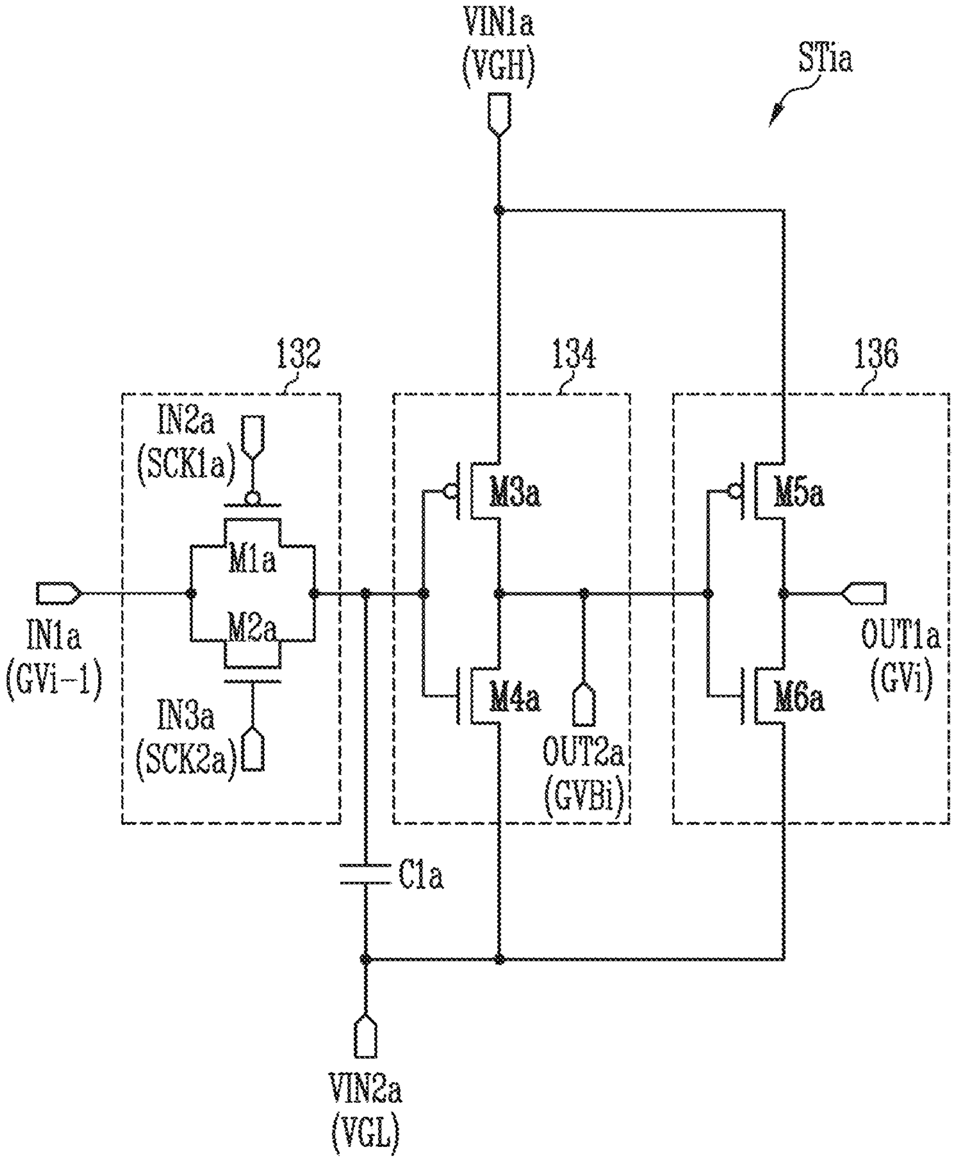
FIG. 8 is a circuit diagram illustrating an embodiment of a stage circuit shown in FIG. 7.

FIG. 8 is a circuit diagram illustrating an embodiment of the stage circuit shown in FIG. 7. In FIG. 8, the ith stage circuit STia is illustrated, and the other remaining stage circuits shown in FIG. 7 may have the same or substantially the same structure as that of the ith stage circuit STia. Accordingly, redundant description may not be repeated.

Referring to FIG. 8, the stage circuit STia in accordance with an embodiment of the present disclosure may include an input unit (e.g., an input circuit) 132, a driver 134, an output unit (e.g., an output circuit) 136, and a first capacitor C1*a*.

The first capacitor C1*a* may be connected between a common terminal of the input unit 132 and the driver 134 and a second power input terminal VIN2*a*. The first capacitor C1*a* may store a voltage of an output signal output to the input unit 132.

The input unit 132 may delay a previous first scan signal GVi−1 by a half cycle according to the scan clock signals SCK1*a* and SCK2*a*, and may supply the delayed signal to the driver 134. As such, the input unit 132 may include a transmission gate.

In an embodiment, the input unit 132 may include a first transistor M1*a* and a second transistor M2*a*. The first transistor M1*a* may be connected between a first input terminal IN1*a* and the driver 134, and a gate electrode of the first transistor M1*a* may be connected to a second input terminal IN2*a*. The first transistor M1*a* may be a P-type transistor, and may be turned on or turned off according to the first clock signal SCK1*a* supplied to the second input terminal IN2*a*. The second transistor M2*a* may be connected between the first input terminal IN1*a* and the driver 134, and a gate electrode of the second transistor M2*a* may be connected to a third input terminal IN3*a*. The second transistor M2*a* may be an N-type transistor, and may be turned on or turned off according to the second scan clock signal SCK2*a* supplied to the third input terminal IN3*a*.

The driver 134 may include (e.g., may be configured as) an inverter, and may invert and output the output signal from the input unit 132. As such, the driver 134 may include a third transistor M3*a* and a fourth transistor M4*a*, which are connected in series between a first power input terminal VIN1*a* and the second power input terminal VIN2*a*.

The third transistor M3*a* may be a P-type transistor, and a gate electrode of the third transistor M3*a* may be connected to the input unit 132. The fourth transistor M4*a* may be an N-type transistor, and a gate electrode of the fourth transistor M4*a* may be connected to the input unit 132. In other words, the third transistor M3*a* and the fourth transistor M4*a* may supply a voltage of the first power source VGH or the second power source VGL to a second output terminal OUT2*a* and the output unit 136, while being alternately turned on or turned off according to the output signal from the input unit 132. An inverted first scan signal GVBi may be output to the second output terminal OUT2*a*. The second output terminal OUT2*a* may be connected to a common node of the third transistor M3*a* and the fourth transistor M4*a*.

The output unit 136 may include (e.g., may be configured as) an inverter, and may invert and output an output signal of the driver 134. As such, the output unit 136 may include a fifth transistor M5*a* and a sixth transistor M6, which are connected in series between the first power input terminal VIN1*a* and the second power input terminal VIN2*a*.

The fifth transistor M5*a* may be a P-type transistor, and a gate electrode of the fifth transistor M5*a* may be connected to the driver 134 (e.g., the second output terminal OUT2*a*). The sixth transistor M6*a* may be an N-type transistor, and a gate electrode of the sixth transistor M6*a* may be connected to the driver 134 (e.g., the second output terminal OUT2*a*). In other words, the fifth transistor M5*a* and the sixth transistor M6*a* may supply a voltage of the first power source VGH or the second power source VGL to the first output terminal OUT1*a*, while being alternately turned on or turned off according to the output signal from the driver 134. A first scan signal GVi may be output to the first output terminal OUT1*a*. The first output terminal OUT1*a* may be connected to a common node of the fifth transistor M5*a* and the sixth transistor M6*a*.

Figure 9:
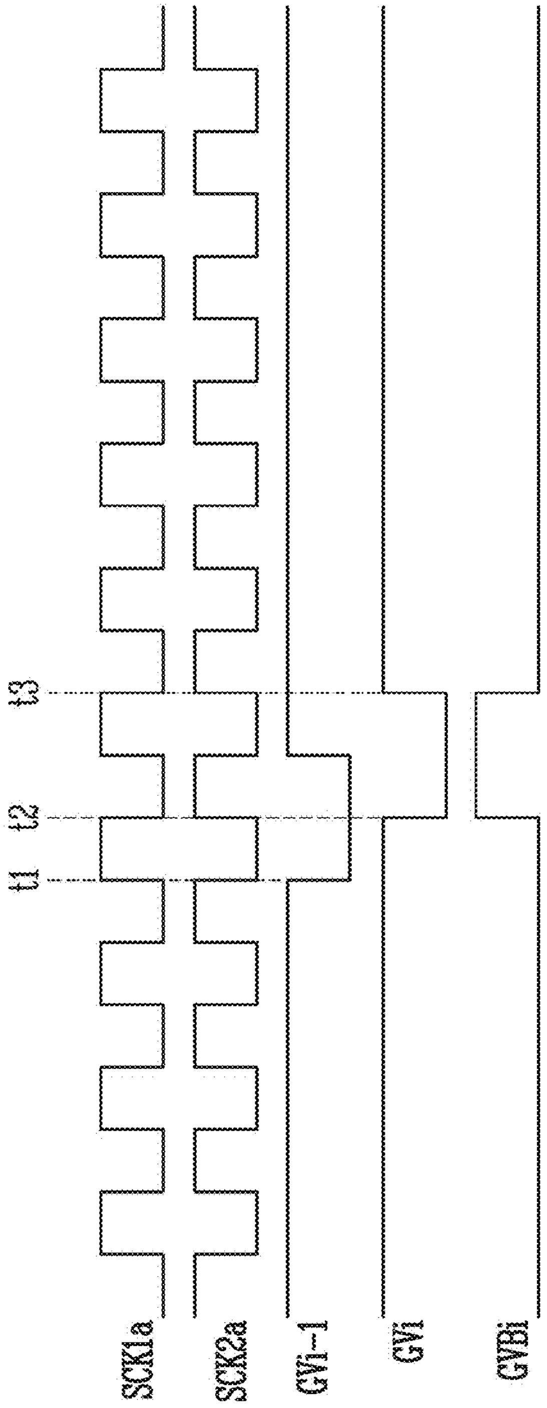
FIG. 9 is a waveform diagram illustrating a method of driving the stage circuit shown in FIG. 8.

FIG. 9 is a waveform diagram illustrating a method of driving the stage circuit shown in FIG. 8.

Referring to FIG. 9, the first scan clock signal SCK1*a* and the second scan clock signal SCK2*a* may be square wave signals having the same cycle as each other and phases that are reversed with each other.

At a first time t1, the previous first scan signal GVi−1 (e.g., a previous enable first scan signal) may be input to the first input terminal IN1*a*. Because the first scan clock signal SCK1*a* may have a high level and the second scan clock signal SCK2*a* may have a low level, the first transistor M1*a* and the second transistor M2*a* may be in the turn-off state. Therefore, the previous first scan signal GVi−1 supplied to the first input terminal IN1*a* may not be supplied to the driver 134.

At a second time t2, the first scan clock signal SCK1*a* may have (e.g., may be set to) the low level, and the second scan clock signal SCK2*a* may have (e.g., may be set to) the high level. Accordingly, the first transistor M1*a* and the second transistor M2*a* may be turned on. When the first transistor Ma and the second transistor M2*a* are turned on, the previous first scan signal GVi−1 may be delayed by a half cycle of the scan clock signals SCK1*a* and SCK2*a* to be supplied to the driver 134.

Then, the third transistor M3*a* may be turned on by the previous first scan signal GVi−1 that is delayed by the half cycle, and accordingly, the voltage of the first power source VGH may be output to the second output terminal OUT2*a*. The voltage of the first power source VGH, which is output to the second output terminal OUT2*a*, may be the inverted first scan signal GVBi (e.g., a disable first scan signal).

When the inverted first scan signal GVBi is output to the second output terminal OUT2*a*, the sixth transistor M6*a* may be turned on. When the sixth transistor M6*a* is turned on, the voltage of the second power source VGL may be output to the first output terminal OUT1*a*. The voltage of the second power source VGL, which is output to the first output terminal OUT1*a*, may be the first scan signal GVi (e.g., an enable first scan signal).

At a third time t3, the supply of the previous first scan signal GVi−1 may be suspended, and accordingly, a high level voltage may be supplied to the first input terminal IN1*a*. At the third time t3, the first scan clock signal SCK1*a* may have (e.g., may be set to) the low level, and the second scan clock signal SCK2*a* may have (e.g., may be set to) the high level. Accordingly, the first transistor M1*a* and the second transistor M2*a* may be turned on. When the first transistor M1*a* and the second transistor M2*a* are turned on, the high level voltage from the first input terminal IN1*a* may be supplied to the driver 134.

When the high level voltage is supplied to the driver 134, the fourth transistor M4*a* may be turned on, and accordingly, the voltage of the second power source VGL may be output to the second output terminal OUT2*a*. Then, the supply of the inverted first scan signal GBVi to the second output terminal OUT2*a* may be suspended. When the voltage of the second power source VGL is output to the second output terminal OUT2*a*, the fifth transistor M5*a* may be turned on. When the fifth transistor M5*a* is turned on, the voltage of the first power source VGH may be output to the first output terminal OUT1*a*. Then, the supply of the first scan signal GVi (e.g., an enable first scan signal) to the first output terminal OUT1*a* may be suspended (e.g., the disable first scan signal may be supplied).

Figure 10:
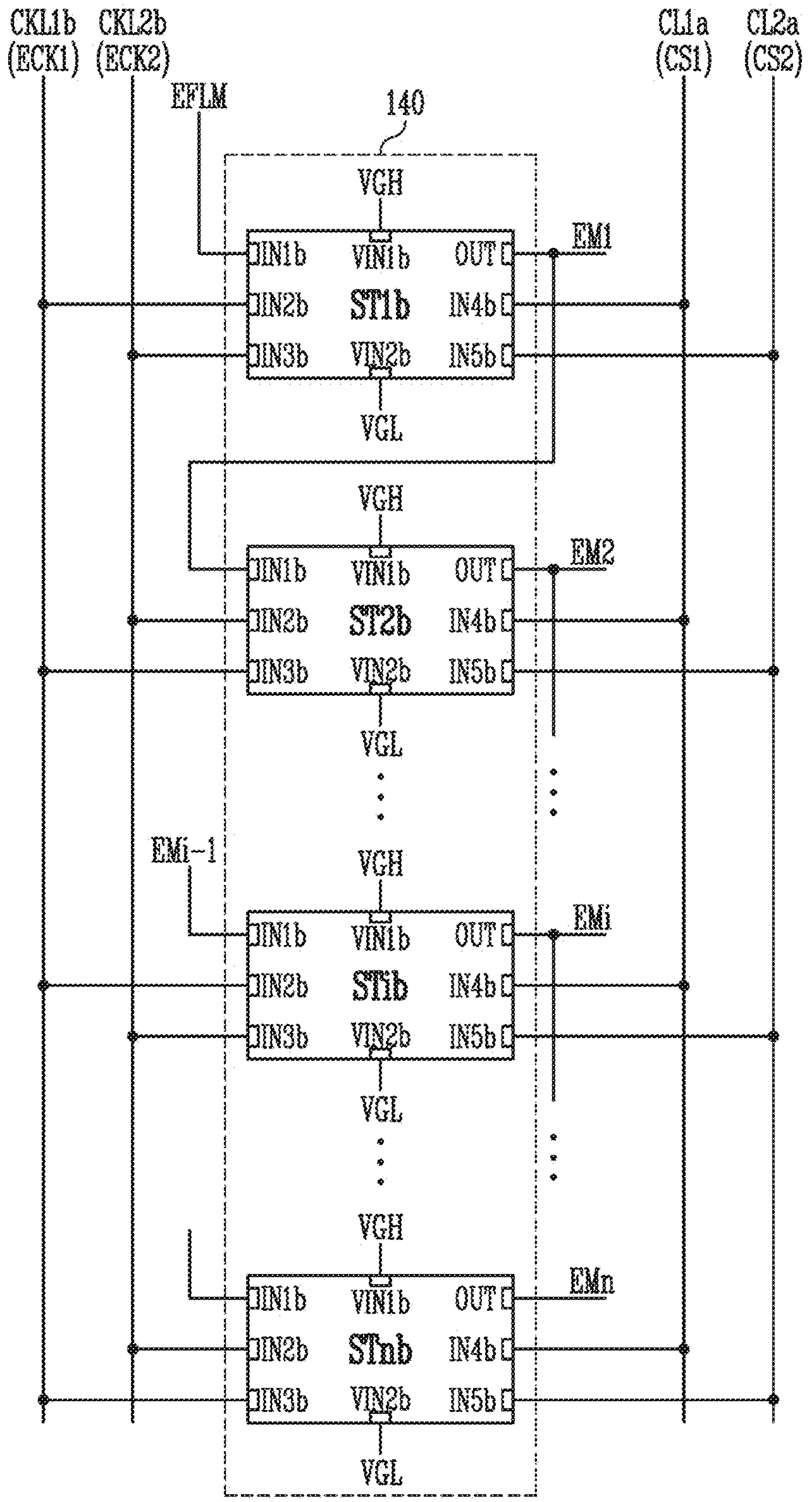
FIG. 10 is a diagram illustrating an embodiment of a first emission driver shown in FIG. 1.

FIG. 10 is a diagram illustrating an embodiment of the first emission driver shown in FIG. 1.

Referring to FIG. 10, the first emission driver 140 in accordance with an embodiment of the present disclosure may include a plurality of stage circuits ST1*b*, ST2*b*, . . . , STib, . . . , and STnb (where n is a natural number of two or more).

Each of the stage circuits ST1*b* to STnb may include a first input terminal IN1*b*, a second input terminal IN2*b*, a third input terminal IN3*b*, a fourth input terminal IN4*b*, a fifth input terminal IN5*b*, a first power input terminal VIN1*b*, a second power input terminal VIN2*b*, and an output terminal OUT.

A start signal EFLM may be supplied to the first input terminal IN1*b* of a first stage circuit ST1*b*. An emission control signal EM (e.g., a disable emission control signal) of a previous stage circuit may be input to the first input terminal IN1*b* of each of the other remaining stage circuits ST2*b* to STnb, except the first stage circuit ST1*b*. As an example, an emission control signal EMi−1 of an (i−1)th stage circuit may be input to the first input terminal IN1*b* of an ith stage circuit STib.

The stage circuits ST1*b* to STnb may be connected to a first clock line CKL1*b* and a second clock line CKL2*b*. As an example, the second input terminal IN2*b* of each of odd-numbered stage circuits ST1*b*, . . . , and STib may be connected to the first clock line CKL1*b* to which a first emission control signal ECK1 is input, and the third input terminal IN3*b* of each of the odd-numbered stage circuits ST1*b*, . . . , and STib may be connected to the second clock line CKL2*b* to which a second emission clock signal ECK2 is input. In addition, the second input terminal IN2*b* of each of even-numbered stage circuits ST2*b*, . . . , and STnb may be connected to the second clock line CKL2*b*, and the third input terminal IN3*b* of each of the even-numbered stage circuits ST2*b*, . . . , and STnb may be connected to the first clock line CKL1*b*.

The stage circuits ST1*b* to STnb may be connected to a first control line CL1*a* and a second control line CL2*a*. A first control signal CS1 may be supplied to the first control line CL1*a*, and a second control signal CS2 may be supplied to the second control line CL2*a*. The fourth input terminal IN4*b* of each of the stage circuits ST1*b* to STnb may be connected to the first control line CL1*a*, and the fifth input terminal IN5*b* of each of the stage circuits ST1*b* to STnb may be connected to the second control line CL2*a*. The stage circuits ST1*b* to STnb may sequentially supply disable emission control signals EM1, EM2, . . . , EMi, . . . , and EMn to the emission control lines EL1 to ELn when a high-level first control signal CS1 and a low-level second control signal CS2 are supplied.

An emission control signal EM may be output to the output terminal OUT of each of the stage circuits ST1*b* to STnb. The first power source VGH may be input to the first power input terminal VIN1*b* of each of the stage circuits ST1*b* to STnb, and the second power source VGL may be input to the second power input terminal VIN2*b* of each of the stage circuits ST1*b* to STnb.

Figure 11:
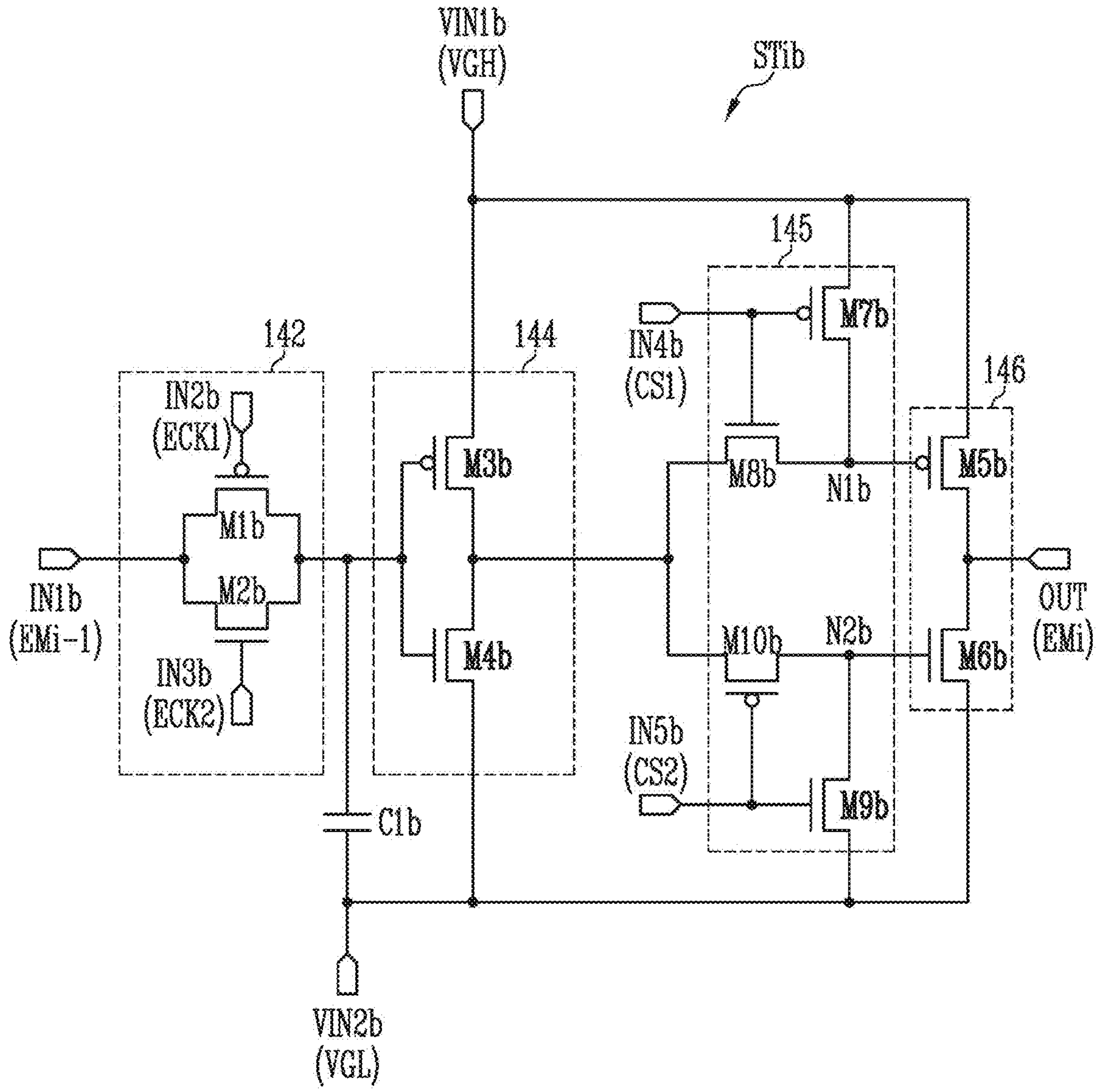
FIG. 11 is a circuit diagram illustrating an embodiment of a stage circuit shown in FIG. 10.

FIG. 11 is a circuit diagram illustrating an embodiment of the stage circuit shown in FIG. 10. In FIG. 11, the ith stage circuit STib is illustrated, and the other remaining stage circuits of FIG. 10 may have the same or substantially the same structure as that of the ith stage circuit STib. Accordingly, redundant description may not be repeated.

Referring to FIG. 11, the stage circuit STib in accordance with an embodiment of the present disclosure may include an input unit (e.g., an input circuit) 142, a first driver 144, a second driver 145, an output unit (e.g., an output circuit) 146, and a first capacitor C1*b*.

The first capacitor C1*b* may be connected between a common terminal of the input unit 142 and the first driver 144 and a second power input terminal VIN2*b*. The first capacitor C1*b* may store a voltage of an output signal output from the input unit 142.

The input unit 142 may delay a previous emission control signal EMi−1 (e.g., a previous disable emission control signal) by a half cycle according to the emission clock signals ECK1 and ECK2, and may supply the delayed signal to the first driver 144. As such, the input unit 142 may include a transmission gate.

In an embodiment, the input unit 142 may include a first transistor M1*b* and a second transistor M2*b*. The first transistor M1*b* may be connected between a first input terminal IN1*b* and the first driver 144, and a gate electrode of the first transistor M1*b* may be connected to a second input terminal IN2*b*. The first transistor M1*b* may be a P-type transistor, and may be turned on or turned off according to the first emission clock signal ECK1 supplied to the second input terminal IN2*b*. The second transistor M2*b* may be connected between the first input terminal IN1*b* and the first driver 144, and a gate electrode of the second transistor M2*b* may be connected to a third input terminal IN3*b*. The second transistor M2*b* may be an N-type transistor, and may be turned on or turned off according to the second emission clock signal ECK2 supplied to the third input terminal IN3*b*.

The first driver 144 may include (e.g., may be configured as) an inverter, and may invert and output the output signal from the input unit 142. As such, the first driver 144 may include a third transistor M3*b* and a fourth transistor M4*b*, which are connected in series between a first power input terminal VIN1*b* and the second power input terminal VIN2*b*.

The third transistor M3*b* may be a P-type transistor, and a gate electrode of the third transistor M3*b* may be connected to the input unit 142. The fourth transistor M4*b* may be an N-type transistor, and a gate electrode of the fourth transistor M4*b* may be connected to the input unit 142. In other words, the third transistor M3*b* and the fourth transistor M4*b* may supply a voltage of the first power source VGH or the second power source VGL to the second driver 145, while being alternately turned on or turned off according to the output signal from the input unit 142.

The second driver 145 may control an electrical connection between the first driver 144 and the output unit 146 according to the first control signal CS1 and the second control signal CS2. As an example, the second driver 145 may electrically connect the first driver 144 and the output unit 146 to each other when the high-level first control signal CS1 and the low-level second control signal CS2 are supplied, and may block the electrical connection between the first driver 144 and the output unit 146 in other cases. When the high-level first control signal CS1 and the low-level second control signal CS2 are not supplied, the second driver 145 may turn off transistors M5*b* and M6*b* included in the output unit 146.

As such, the second driver 145 may include a seventh transistor M7*b*, an eighth transistor M8*b*, a ninth transistor M9*b*, and a tenth transistor M10*b*.

The seventh transistor M7*b* may be connected between the first power input terminal VIN1*b* and a first node N1*b*, and a gate electrode of the seventh transistor M7*b* may be connected to a fourth input terminal IN4*b*. The seventh transistor M7*b* may be turned on when a low-level first control signal CS1 is supplied to the fourth input terminal In4*b*, and may be turned off in other cases.

The eighth transistor M8*b* may be connected between the first driver 144 (e.g., a common node of the third transistor M3*b* and the fourth transistor M4*b*) and the first node N1*b*, and a gate electrode of the eighth transistor M8*b* may be connected to the fourth input terminal IN4*b*. The eighth transistor M8*b* may be turned on when the high-level first control signal CS1 is supplied, and may be turned off in other cases.

The ninth transistor M9*b* may be connected between the second power input terminal VIN2*b* and a second node N2*b*, and a gate electrode of the ninth transistor M9*b* may be connected to a fifth input terminal IN5*b*. The ninth transistor M9*b* may be turned on when a high-level second control signal SC2 is supplied to the fifth input terminal IN5*b*, and may be turned off in other cases.

The tenth transistor M10*b* may be connected between the first driver 144 (e.g., a common node of the third transistor M3*b* and the fourth transistor M4*b*) and the second node N2*b*, and a gate electrode of the tenth transistor M10*b* may be connected to the fifth input terminal IN5*b*. The tenth transistor M10*b* may be turned on when the low-level second control signal CS2 is supplied, and may be turned off in other cases.

The output unit 146 may include (e.g., may be configured as) an inverter, and may invert and output an output signal from the first driver 144. As such, the output unit 146 may include a fifth transistor M5*b* and a sixth transistor M6*b*, which are connected in series between the first power input terminal VIN1*b* and the second power input terminal VIN2*b*.

The fifth transistor M5*b* may be a P-type transistor, and a gate electrode of the fifth transistor M5*b* may be connected to first node N1*b*. The sixth transistor M6*b* may be an N-type transistor, and a gate electrode of the sixth transistor M6*b* may be connected to the second node N2*b*. The fifth transistor M5*b* and the sixth transistor M6*b* may supply a voltage of the first power source VGH or the second power source VGL to the output terminal OUT, while being alternately turned on or turned off according to voltages of the first node N1*b* and the second node N2*b*. The output terminal OUT may be connected to a common node of the fifth transistor M5*b* and the sixth transistor M6*b*, and an emission control signal EMi may be output from the output terminal OUT.

Figure 12:
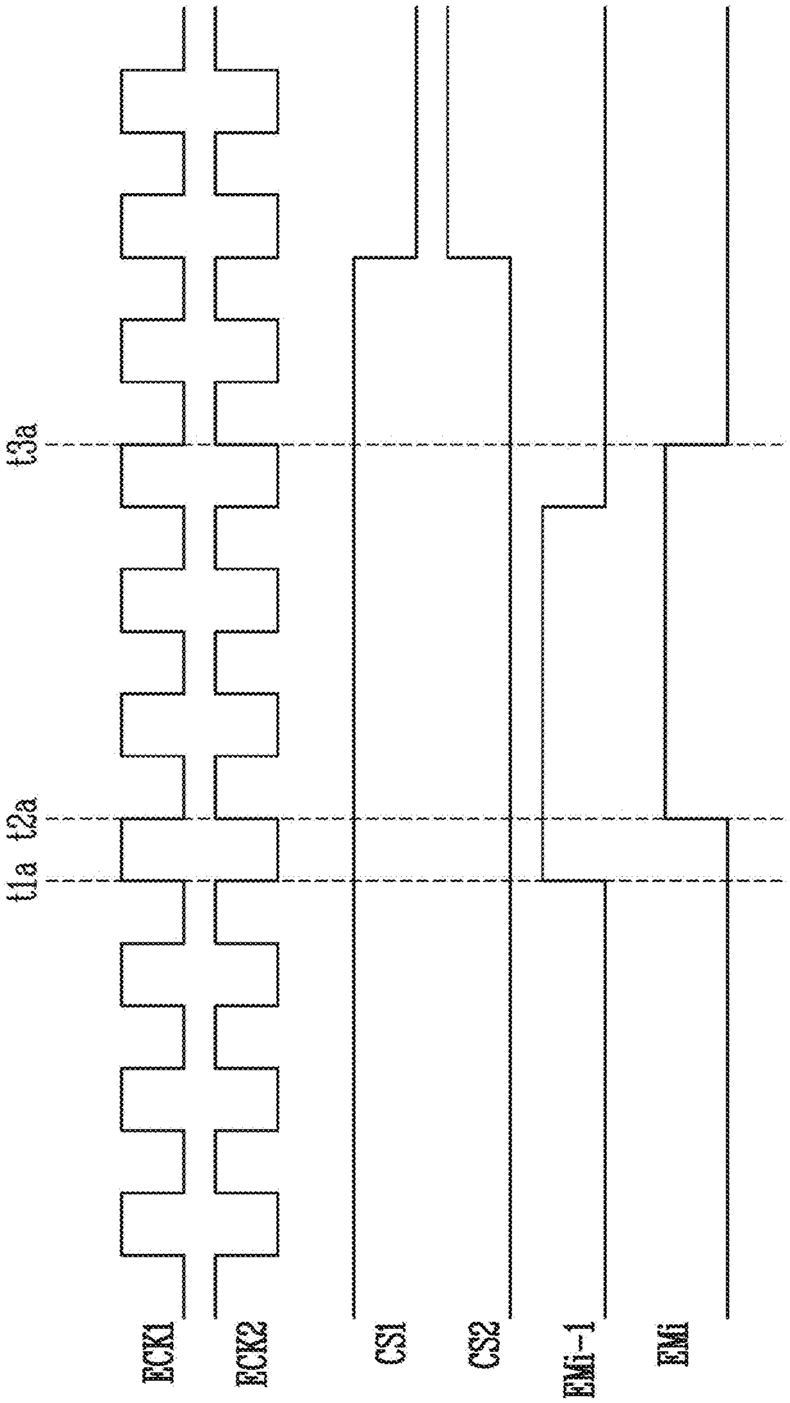
FIG. 12 is a waveform diagram illustrating a method of driving the stage circuit shown in FIG. 11.

FIG. 12 is a waveform diagram illustrating a method of driving the stage circuit shown in FIG. 11.

Referring to FIG. 12, the first emission clock signal ECK1 and the second emission clock signal ECK2 may be square wave signals that have the same cycle as each other and phases that are reversed from each other.

When the high-level first control signal CS1 and the low-level second control signal CS2 are supplied, the eighth transistor M8*b* and the tenth transistor M10*b* may be turned on, and the seventh transistor M7*b* and the ninth transistor M9*b* may be turned off. When the eighth transistor M8*b* and the tenth transistor M10*b* are turned on, the first node N1*b* and the second node N2*b* may be electrically connected to the first driver 144. Also, the first node N1*b* and the second node N2*b* may be electrically connected to each other.

At a first time t1*a*, the previous emission control signal EMi−1 (e.g., a previous disable emission control signal) may be input to the first input terminal IN1*b*. Because the first emission clock signal ECK1 has a high level and the second emission clock signal ECK2 has a low level, the first transistor M1*b* and the second transistor M2*b* may be in the turn-off state. Therefore, the previous emission control signal EMi−1 supplied to the first input terminal IN1*b* may not be supplied to the first driver 144.

At a second time t2*a*, the first emission clock signal ECK1 may have the low level, and the second emission clock signal ECK2 may have the high level.

Accordingly, the first transistor M1*b* and the second transistor M2*b* may be turned on. When the first transistor M1*b* and the second transistor M2*b* are turned on, the previous emission control signal EMi−1 may be delayed by a half cycle of the emission clock signals ECK1 and ECK2 and supplied to the first driver 144.

Then, by the emission control signal EMi−1 that is delayed by the half cycle, the third transistor M3*b* may be turned off, and the fourth transistor M4*b* may be turned on. When the fourth transistor M4*b* is turned on, the voltage of the second power source VGL may be supplied to the first node N1*b* and the second node N2*b*. When the voltage of the second power source VGL is supplied to the first node N1*b* and the second node N2*b*, the fifth transistor M5*b* may be turned on and the sixth transistor M6*b* may be turned off.

When the fifth transistor M5*b* is turned on, the voltage of the first power source VGH may be supplied to the output terminal OUT. The voltage of the first power source VGH, which is supplied to the output terminal OUT, is an emission control signal EMi (e.g., a disable emission control signal), and may be supplied to the emission control line ELi.

At a third time t3*a*, the supply of the previous disable emission control signal EMi−1 may be suspended, and accordingly, a low level voltage may be supplied to the first input terminal IN1*b*. At the third time t3*a*, the first emission clock signal ECK1 may have the low level, and the second emission clock signal ECK2 may have the high level. Accordingly, the first transistor M1*b* and the second transistor M2*b* may be turned on. When the first transistor M1*b* and the second transistor M2*b* are turned on, the low level voltage may be supplied to the first driver 144.

When the low level voltage is supplied to the first driver 144, the third transistor M3*b* may be turned on, and the fourth transistor M4*b* may be turned off. When the third transistor M3*b* is turned on, the voltage of the first power source VGH may be supplied to the first node N1*b* and the second node N2*b*. When the voltage of the first power source VGH is supplied to the first node N1*b* and the second node N2*b*, the sixth transistor M6*b* may be turned on and the fifth transistor M5*b* may be turned off.

When the sixth transistor M6*b* is turned on, the voltage of the second power source VGL may be supplied to the output terminal OUT. The voltage of the second power source VGL, which is supplied to the output terminal OUT, is an enable emission control signal EMi, and may be supplied to the emission control line ELi.

When the display device 100 is driven in the second mode, the low-level first control signal CS1 and the high-level second control signal CS2 may be supplied. When the low-level first control signal CS1 is supplied, the seventh transistor M7*b* may be turned on so that the voltage of the first power source VGH is supplied to the first node N1*b*. When the voltage of the first power source VGH is supplied to the first node N1*b*, the fifth transistor M5*b* may be in the turn-off state.

When the high-level second control signal CS2 is supplied, the ninth transistor M9*b* may be turned on so that the voltage of the second power source VGL is supplied to the second node N2*b*. When the voltage of the second power source VGL is supplied to the second node N2*b*, the sixth transistor M6*b* may be in the turn-off state.

In other words, when the low-level first control signal CS1 and the high-level second control signal CS2 are supplied corresponding to the driving of the display device 100 in the second mode, the fifth transistor M5*b* and the sixth transistor M6*b*, which are included in each of the stage circuits ST1*b* to STnb, may be in the turn-off state. Therefore, the first emission driver 140 may not generate any emission control signal EM when the display device 100 is driven in the second mode.

Figure 13:
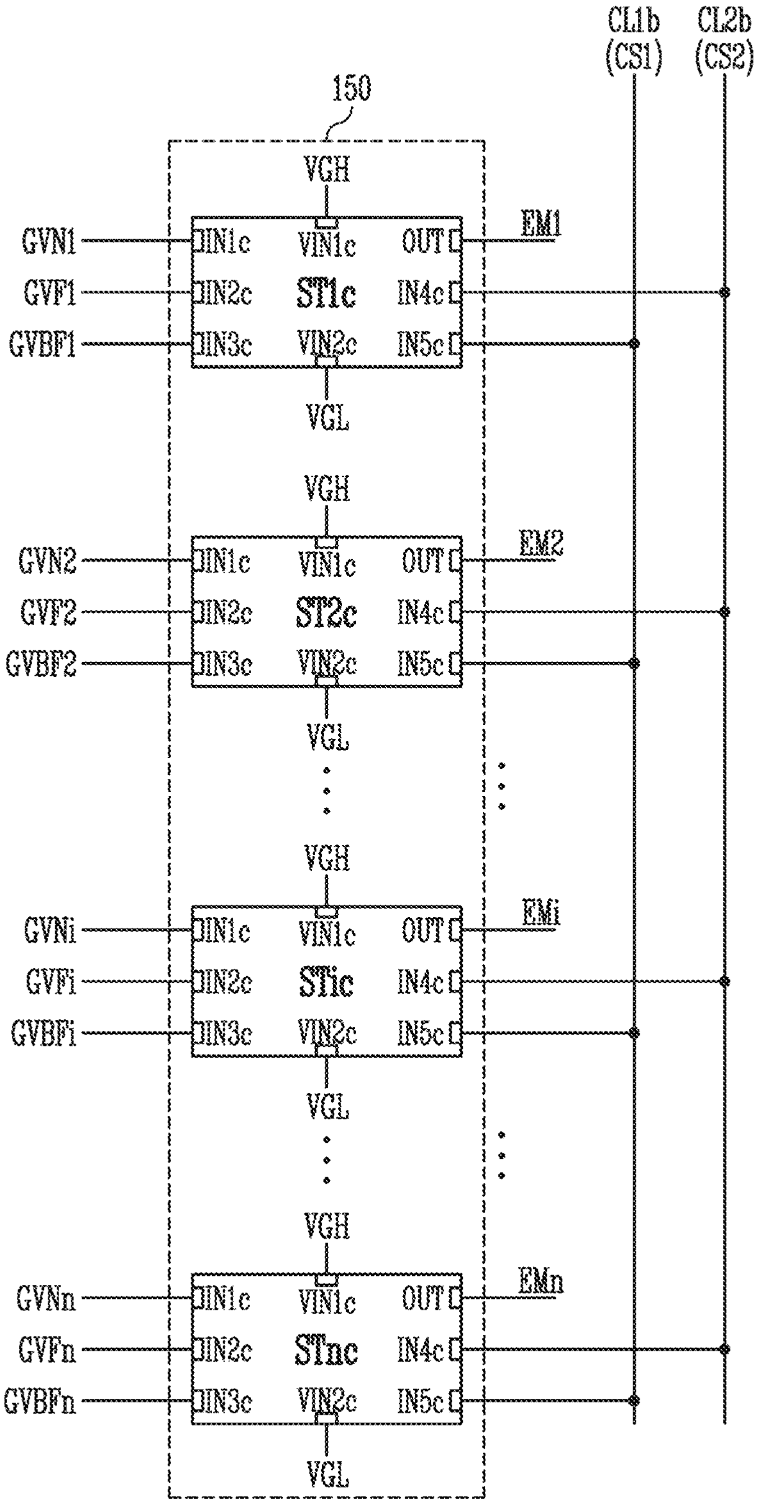
FIG. 13 is a diagram illustrating an embodiment of a second emission driver shown in FIG. 1.

FIG. 13 is a diagram illustrating an embodiment of the second emission driver shown in FIG. 1.

Referring to FIG. 13, the second emission driver 150 in accordance with an embodiment of the present disclosure may include a plurality of stage circuits ST1*c*, ST2*c*, . . . , STic, . . . , and STnc (where n is a natural number of two or more).

Each of the stage circuits ST1*c* to STnc may include a first input terminal IN1*c*, a second input terminal IN2*c*, a third input terminal IN3*c*, a fourth input terminal IN4*c*, a fifth input terminal IN5*c*, a first power input terminal VIN1*c*, a second power input terminal VIN2*c*, and an output terminal OUT.

A next first scan signal GVN (e.g., GVN1, GVN2, . . . , GVNi, . . . , or GVNn) may be input to the first input terminal IN1*c* of each of the stage circuits ST1*c* to STnc. A previous first scan signal GVF (e.g., GVF1, GVF2, . . . , GVFi, . . . , or GVFn) or a previous enable first scan signal may be input to the second input terminal IN2*c* of each of the stage circuits ST1*c* to STnc. A previous inverting first scan signal GVBF (e.g., GVBF1, GVBF2, . . . , GVBFi, . . . , or GVBFn) may be input to the third input terminal IN3*c* of each of the stage circuits ST1*c* to STnc.

As an example, a next first scan signal GVNi may be input to the first input terminal IN1*c* of an ith stage circuit STic, a previous first scan signal GVFi may be input to the second input terminal IN2*c* of the ith stage circuit STic, and a previous inverting first scan signal GVBFi may be input to the third input terminal IN3*c* of the ith stage circuit STic.

The next first scan signal GVNi may be any one of the first scan signals GV output from the stage circuits located on horizontal lines after an (i+1)th horizontal line. In an example, the next first control signal GVNi may be an (i+4)th first scan signal GV.

The previous first scan signal GVFi may be any one of the first scan signals GV output from the stage circuits of the first scan driver 130, which are located on horizontal lines before an (i−1)th horizontal line. As an example, the previous first scan signal GVFi may be an (i−2)th first scan signal GV.

The previous inverting first scan signal GVBFi may be any one of the inverting first scan signals GVB output from the stage circuits of the first scan driver 130, which are located on the horizontal lines before the (i−1)th horizontal line. As an example, the previous inverting first scan signal GVBFi may be an (i−2)th inverting first scan signal GVB.

The stage circuits ST1*c* to STnc may be connected to a first control line CL1*b* and a second control line CL2*b*. A first control signal CS1 may be supplied to the first control line CL1*b*, and a second control signal CS2 may be supplied to the second control line CL2*b*. The fourth input terminal IN4*c* of each of the stage circuits ST1*c* to STnc may be connected to the second control line CL2*b*, and the fifth input terminal IN5*c* of each of the stage circuits ST1*c* to STnc may be connected to the first control line CL1*b*. The stage circuits ST1*c* to STnc may sequentially supply disable emission control signals EM1, EM2, . . . , EMi, . . . , and EMn to the emission control lines EL1 to ELn when a low-level first control signal CS1 and a high-level second control signal CS2 are supplied.

An emission control signal EM may be output to the output terminal OUT of each of the stage circuits ST1*c* to STnc. The first power source VGH may be input to the first power input terminal VIN1*c* of each of the stage circuits ST1*c* to STnc, and the second power source VGL may be input to the second power input terminal VIN2*c* of each of the stage circuits ST1*c* to STnc.

Figure 14:
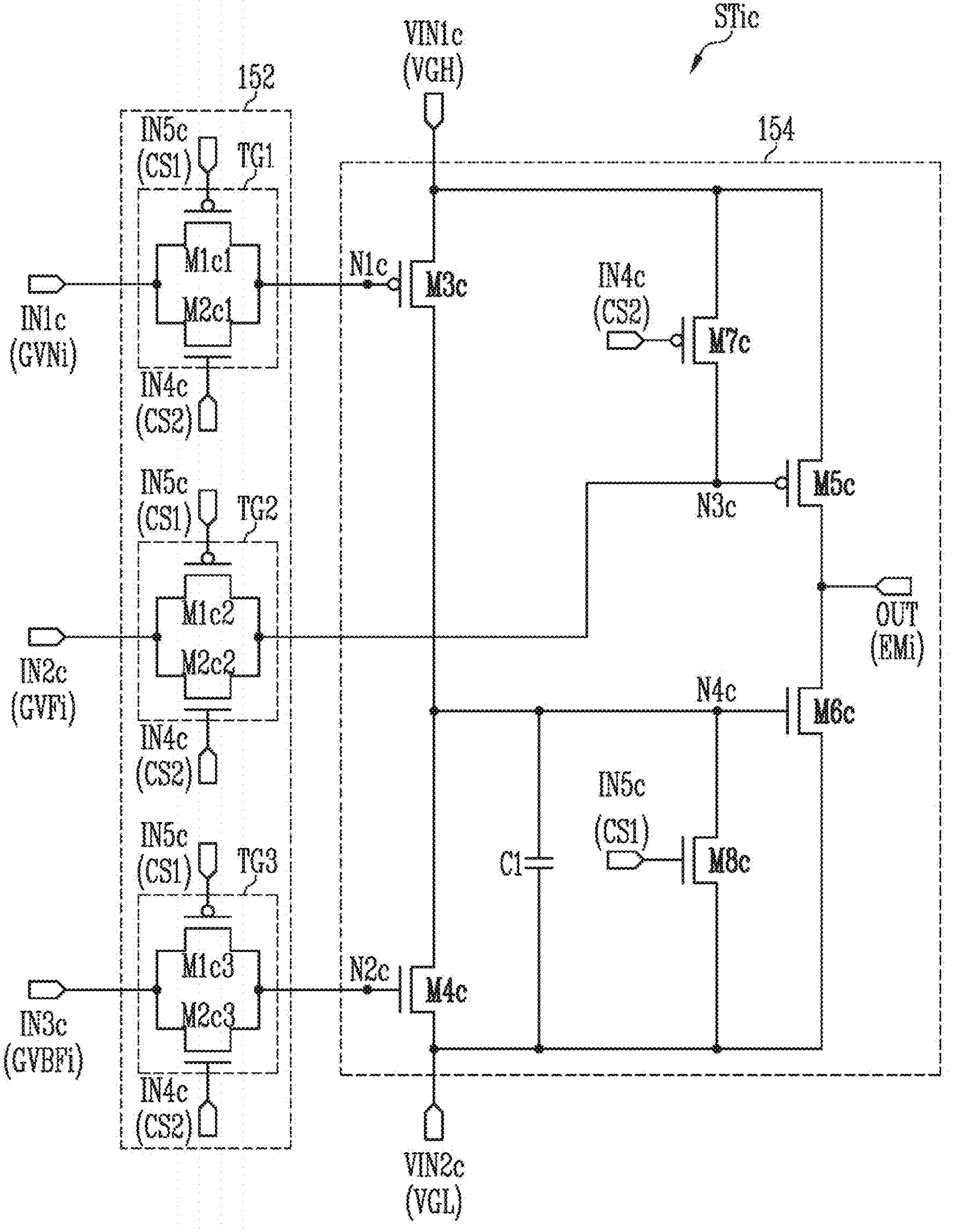
FIG. 14 is a circuit diagram illustrating an embodiment of a stage circuit shown in FIG. 13.

FIG. 14 is a circuit diagram illustrating an embodiment of the stage circuit shown in FIG. 13. In FIG. 14, the ith stage circuit STic is illustrated, and the other remaining stage circuits in FIG. 13 may have the same or substantially the same structure as that of the ith stage circuit STic. Accordingly, redundant description may not be repeated.

Referring to FIG. 14, the stage circuit STic in accordance with an embodiment of the present disclosure may include an input unit (e.g., an input circuit) 152 and an output unit (e.g., an output circuit) 154.

The input unit 152 may supply a next first scan signal GVNi, a previous first scan signal GVFi, and a previous inverting first scan signal GVBFi to the output unit 154 according to the first control signal CS1 and the second control signal CS2.

As such, the input unit 152 may include a first transmission gate TG1, a second transmission gate TG2, and a third transmission gate TG3.

The first transmission gate TG1 may include a first transistor M1*c*1 and a second transistor M2*c*1, which are connected in parallel between a first input terminal IN1*c* and a first node N1*c* of the output unit 154. The first transistor M1*c*1 may be a P-type transistor, and a gate electrode of the first transistor M1*c*1 may be connected to a fifth input terminal IN5*c*. The first transistor M1*c*1 may be turned on when the low-level first control signal CS1 is supplied to the fifth input terminal IN5*c*. The second transistor M2*c*1 may be an N-type transistor, and a gate electrode of the second transistor M2*c*1 may be connected to a fourth input terminal IN4*c*. The second transistor M2*c*1 may be turned on when the high-level second control signal CS2 is supplied to the fourth input terminal IN4*c*.

The second transmission gate TG2 may include a first transistor M1*c*2 and a second transistor M2*c*2, which are connected in parallel between a second input terminal IN2*c* and a third node N3*c* of the output unit 154. The first transistor M1*c*2 may be a P-type transistor, and a gate electrode of the first transistor M1*c*2 may be connected to the fifth input terminal IN5*c*. The first transistor M1*c*2 may be turned on when the low-level first control signal CS1 is supplied to the fifth input terminal IN5*c*. The second transistor M2*c*2 may be an N-type transistor, and a gate electrode of the second transistor M2*c*2 may be connected to the fourth input terminal IN4*c*. The second transistor M2*c*2 may be turned on when the high-level second control signal CS2 is supplied to the fourth input terminal IN4*c*.

The third transmission gate TG3 may include a first transistor M1*c*3 and a second transistor M2*c*3, which are connected in parallel between a third input terminal IN3*c* and a second node N2*c* of the output unit 154. The first transistor M1*c*3 may be a P-type transistor, and a gate electrode of the first transistor M1*c*3 may be connected to the fifth input terminal IN5*c*. The first transistor M1*c*3 may be turned on when the low-level first control signal CS1 is supplied to the fifth input terminal IN5*c*. The second transistor M2*c*3 may be an N-type transistor, and a gate electrode of the second transistor M2*c*3 may be connected to the fourth input terminal IN4*c*. The second transistor M2*c*3 may be turned on when the high-level second control signal CS2 is supplied to the fourth input terminal IN4*c*.

The output unit 154 may output an emission control signal EMi (e.g., a disable emission control signal) to an output terminal OUT according to the first control signal CS1, the second control signal CS2, the next first scan signal GVNi, the previous first scan signal GVFi, and the previous inverting first scan signal GVBFi.

As such, the output unit 154 may include a third transistor M3*c*, a fourth transistor M4*c*, a fifth transistor M5*c*, a sixth transistor M6*c*, a seventh transistor M7*c*, an eighth transistor M8*c*, and a first capacitor C1.

The third transistor M3*c* and the fourth transistor M4*c* may be connected in series between a first power input terminal VIN1*c* and a second power input terminal VIN2*c*. The third transistor M3*c* may be a P-type transistor, and a gate electrode of the third transistor M3*c* may be connected to the first node N1*c* (e.g., the first transmission gate TG1). The fourth transistor M4*c* may be an N-type transistor, and a gate electrode of the fourth transistor M4*c* may be connected to the second node N2*c* (e.g., the third transmission gate TG3).

The fifth transistor M5*c* and the sixth transistor M6*c* may be connected in series between the first power input terminal VIN1*c* and the second power input terminal VIN2*c*. The fifth transistor M5*c* may be a P-type transistor, and a gate electrode of the fifth transistor M5*c* may be connected to the third node N3*c* (e.g., the second transmission gate TG2). The sixth transistor M6*c* may be an N-type transistor, and a gate electrode of the sixth transistor M6*c* may be connected to a fourth node N4*c*. The output terminal OUT may be connected to a common node of the fifth transistor M5*c* and the sixth transistor M6*c*.

The seventh transistor M7*c* may be connected between the first power input terminal VIN1*c* and the third node N3*c*, and a gate electrode of the seventh transistor M7*c* may be connected to the fourth input terminal IN4*c*. The seventh transistor M7*c* may be a P-type transistor, and may be turned on when a low-level second control signal CS2 is supplied to the fourth input terminal IN4*c*.

The eighth transistor M8*c* may be connected between the fourth node N4*c* and the second power input terminal VIN2*c*, and a gate electrode of the eighth transistor M8*c* may be connected to the fifth input terminal IN5*c*. The eighth transistor M8*c* may be an N-type transistor, and may be turned on when a high-level first control signal CS1 is supplied to the fifth input terminal IN5*c*.

Figure 15:
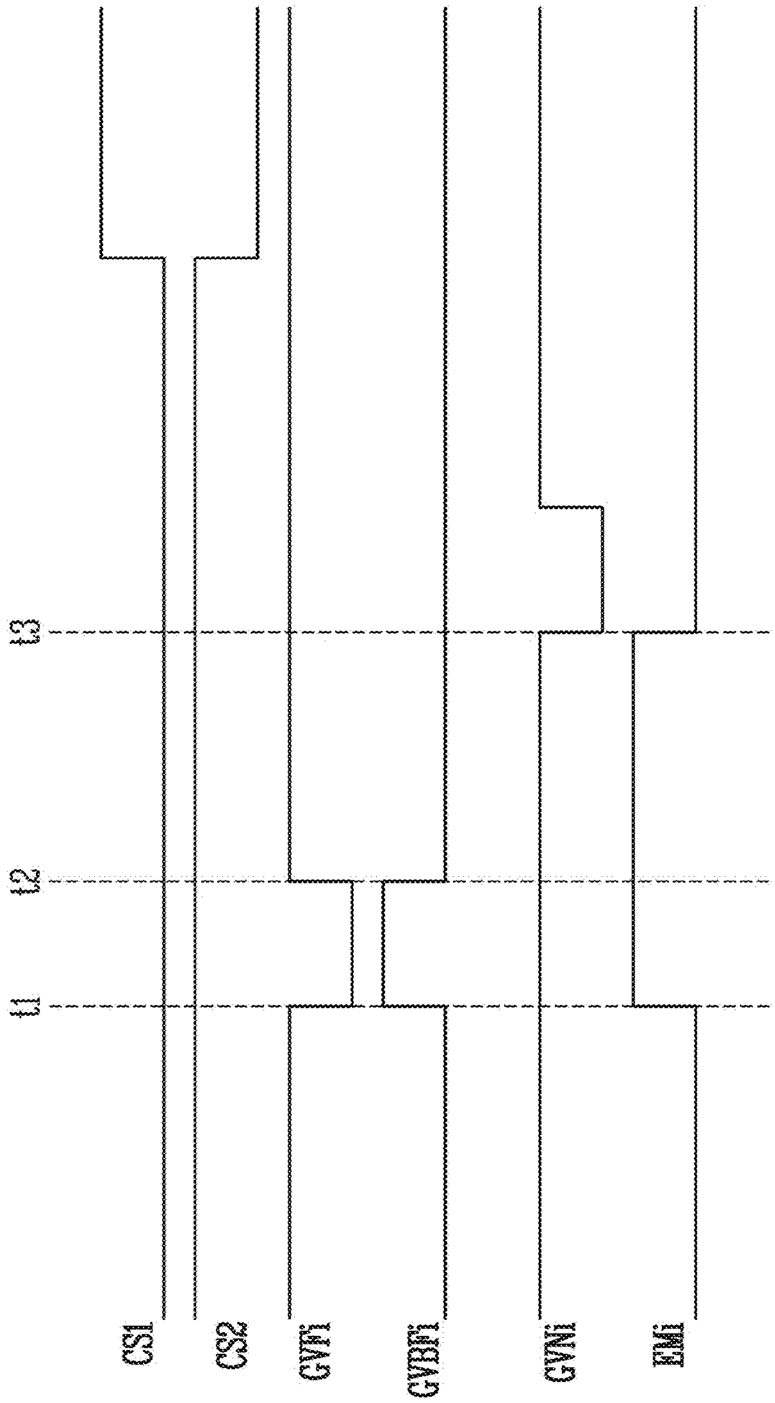
FIG. 15 is a waveform diagram illustrating a method of driving the stage circuit shown in FIG. 14.

FIG. 15 is a waveform diagram illustrating a method of driving the stage circuit shown in FIG. 14.

Referring to FIG. 15, when the low-level first control signal CS1 and the high-level second control signal CS2 are supplied, the transmission gates TG1, TG2, and TG3 may be in a turn-on state. As an example, when the low-level first control signal CS1 and the high-level second control signal CS2 are supplied, the first transistors M1*c*1, M1*c*2, and M1*c*3 and the second transistors M2*c*1, M2*c*2, and M2*c*3, which are included in the transmission gates TG1, TG2, and TG3, may be in the turn-on state. Also, when the low-level first control signal CS1 and the high-level second control signal CS2 are supplied, the seventh transistor M7*c* and the eighth transistor M8*c* may be in the turn-off state.

At a first time t1, the previous first scan signal GVFi may be input to the second input terminal IN2*c*, and the previous inverting first scan signal GVBFi may be input to the third input terminal IN3*c*. The previous first scan signal GVFi input to the second input terminal IN2*c* may be supplied to the third node N3*c* via the second transmission gate TG2, and accordingly, the fifth transistor M5*c* may be turned on. When the fifth transistor M5*c* is turned on, the voltage of the first power source VGH may be supplied to the output terminal OUT. The voltage of the first power source VGH, which is supplied to the output terminal OUT, may be supplied as the disable emission control signal EMi to the emission control line ELi.

The previous inverting first scan signal GVBFi input to the third input terminal IN3*c* may be supplied to the second node N2*c* via the third transmission gate TG3, and accordingly, the fourth transistor M4*c* may be turned on. When the fourth transistor M4*c* is turned on, the voltage of the second power source VGL may be supplied to the fourth node N4*c*, and accordingly, the sixth transistor M6*c* may be turned off. When the sixth transistor M6*c* is turned off, the voltage of the first power source VGH may be stably supplied to the output terminal OUT. The first capacitor C1 may store the voltage of the fourth node N4*c*, and accordingly, the fourth node N4*c* may maintain or substantially maintain the voltage of the second power source VGL even when the fourth transistor M4*c* is turned off.

At a second time t2, the supply of the previous first scan signal GVFi to the second input terminal IN2*c* may be suspended, and the supply of the previous inverting first scan signal GVBFi to the third input terminal IN3*c* may be suspended. The second input terminal IN2*c* may have a high level voltage, and the third input terminal IN3*c* may have a low level voltage.

The high level voltage input to the second input terminal IN2*c* may be supplied to the third node N3*c*, and accordingly, the fifth transistor M5*c* may be in the turn-off state. The low level voltage input to the third input terminal IN3*c* may be supplied to the fourth transistor M4*c*, and accordingly, the fourth transistor M4*c* may be in the turn-off state. The turn-off state of sixth transistor M6*c* may be maintained or substantially maintained according to the voltage stored in the first capacitor C1.

At the second time t2, the fifth transistor M5*c* and the sixth transistor M6*c* may be in the turn-off state. The output terminal OUT may maintain or substantially maintain a voltage level of the first power source VGH due to a parasitic capacitor of the emission control line ELi or the like.

At a third time t3, the next first scan signal GVNi may be input to the first input terminal IN1*c*. The next first scan signal GVNi input to the first input terminal IN1*c* may be supplied to the first node N1*c* via the first transmission gate TG1, and accordingly, the third transistor M3*c* may be turned on. When the third transistor M3*c* is turned on, the voltage of the first power source VGH may be supplied to the fourth node N4*c*. When the voltage of the first power source VGH is supplied to the fourth node N4*c*, the sixth transistor M6*c* may be turned on, and accordingly, the voltage of the second power source VGL may be supplied to the output terminal OUT. When the voltage of the second power source VGL is supplied to the output terminal OUT, the supply of the emission control signal may be suspended (e.g., the supply of the disable emission control signal may be suspended), or in other words, the enable emission control signal may be supplied.

As described above, the stage circuit STic may generate the disable emission control signal using the next first scan signal GVNi, the previous first scan signal GVFi, and the previous inverting first scan signal GVBFi. In other words, the stage circuit STic may not be supplied with any separate clock signal, and thus, power consumption may be reduced.

Further, the stage circuit STic may supply timings of the next first scan signal GVNi, the previous first scan signal GVFi, and the previous inverting first scan signal GVBFi, so that the width of the disable emission control signal may be freely set.

Figure 16A:
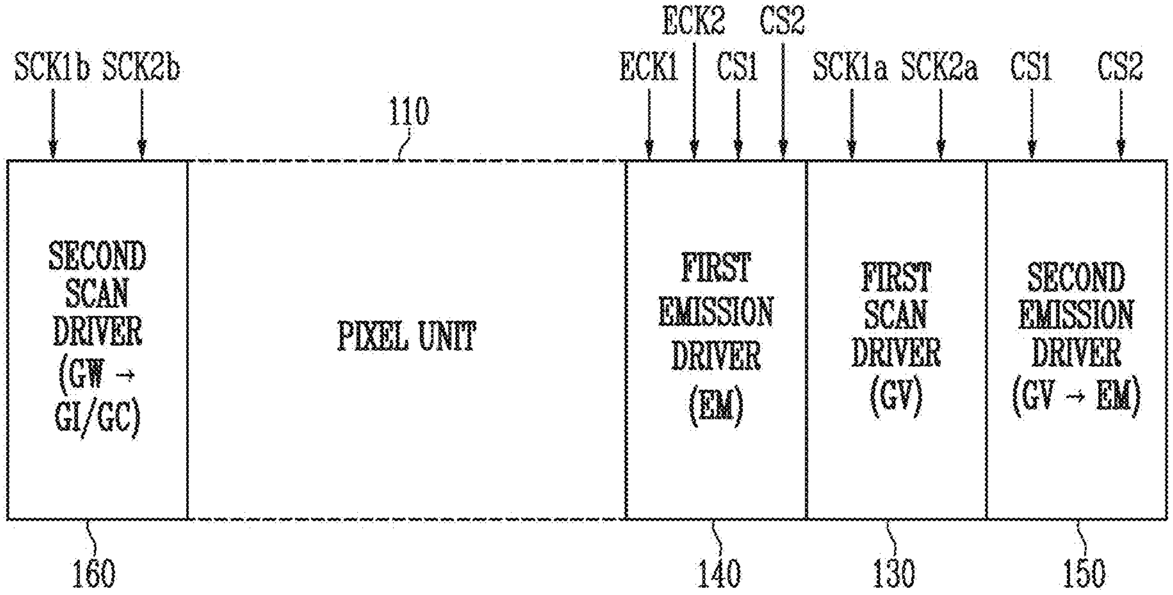
FIGS. 16A-16C are diagrams illustrating one or more embodiments of clock signals that are supplied corresponding to a first mode and a second mode.
Figure 16B:
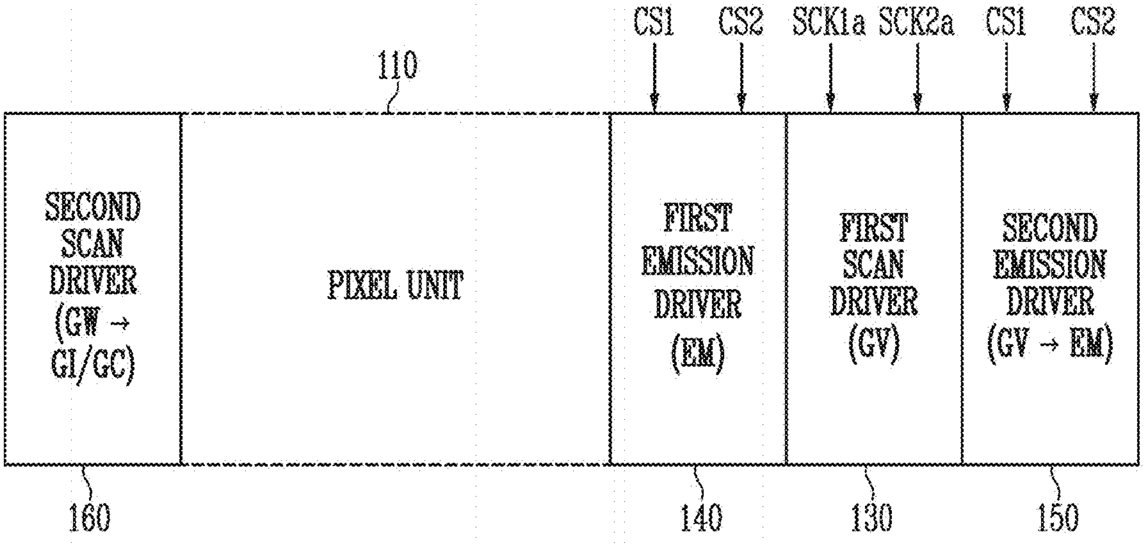
Figure 16C:
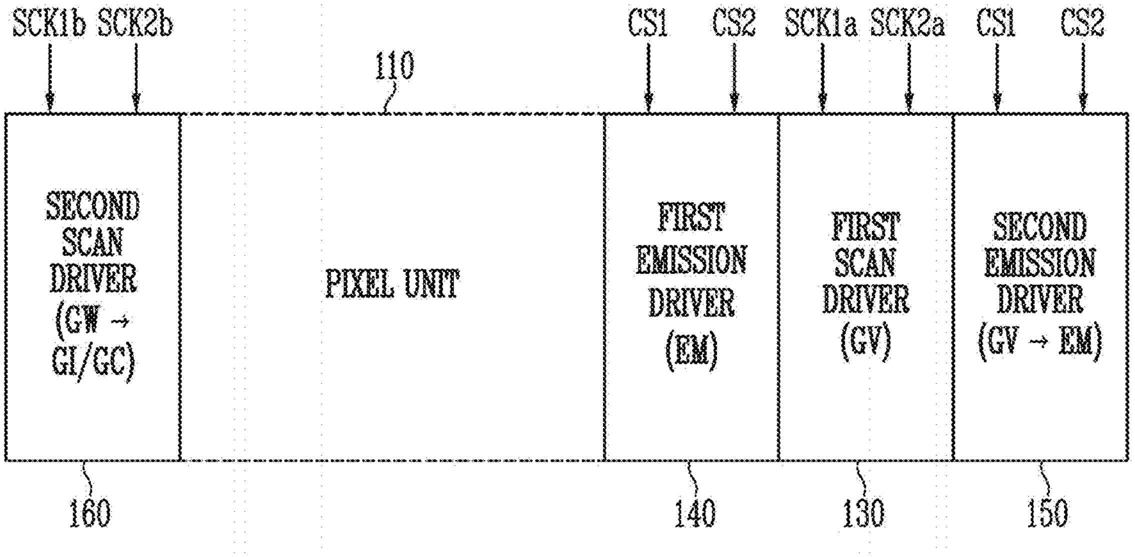

FIGS. 16A through 16C are diagrams illustrating one or more embodiments of clock signals that are supplied corresponding to the first mode and the second mode.

Referring to FIG. 16A, when the display device 100 is driven in the first mode (e.g., when the display device 100 is driven at a high frequency or in a display scan period DSP), scan clock signals SCK1*a* and SCK2*a* may be supplied to the first scan driver 130 from the timing controller 120, scan clock signals SCK1*b* and SCK2*b* may be supplied to the second scan driver 160 from the timing controller 120, and emission clock signals ECK1 and ECK2 may be supplied to the first emission driver 140 from the timing controller 120.

The first scan driver 130 may include the stage circuits ST1*a* to STna as shown in FIGS. 7 and 8, and may sequentially generate an enable first scan signal GV according to the scan clock signals SCK1*a* and SCK2*a*.

The second scan driver 160 may include the stage circuits ST1*a* to STna as shown in FIGS. 7 and 8, and the stage circuits ST1*c* to STnc as shown in FIGS. 13 and 14. The second scan driver 160 may generate scan signals GI, GC, GB, and GW according to the scan clock signals SCK1*b* and SCK2*b*. As an example, the second scan driver 160 may generate a second scan signal GW (and a fifth scan signal GB), using the stage circuits ST1*a* to STna, and may generate a third scan signal GC (and a fourth scan signal GI), using the stage circuits ST1*c* to STnc. Additionally, the second scan driver 160 may include various suitable kinds of stage circuits as would be understood by those having ordinary skill in the art.

The first emission driver 140 may sequentially generate a disable emission control signal EM according to a high-level first control signal CS1, a low-level second control signal CS2, and the emission clock signals ECK1 and ECK2.

The second emission driver 150 may be in an off-state according to the high-level first control signal CS1 and the low-level second control signal CS2. In other words, when the display device 100 is driven in the first mode, the pixels PX may be driven while the first scan driver 130, the second scan driver 160, and the first emission driver 140 are driven.

Additionally, GW→GI/GC shown in the second scan driver 160 in FIG. 16A indicates that other scan signals GI and GC may be generated using the scan signal GW. Similarly, GV→EM shown in the second emission driver 150 in FIG. 16A indicates that an emission control signal EM may be generated by the scan signal GV.

Referring to FIG. 16B, when the display device 100 is driven in the second mode (e.g., when the display device 100 is driven in a self-scan period SSP), the scan clock signal SCK1*a* and SCK2*a* may be supplied to the first scan driver 130 from the timing controller 120.

The first scan driver 130 may sequentially generate an enable first scan signal GV according to the scan clock signals SCK1*a* and SCK2*a*.

The first emission driver 140 may be in the off-state according to a low-level first control signal CS1 and a high-level second control signal CS2. The second emission driver 150 may sequentially generate a disable emission control signal EM according to the low-level first control signal CS1, the high-level second control signal CS2, a first scan signal GV, and an inverting first scan signal GVB.

The scan clock signals SCK1*b* and SCK2*b* and the emission clock signals ECK1 and ECK2 may not be supplied during a period in which the display device 100 is driven in the second mode. As such, unnecessary power may not be consumed corresponding to the scan clock signals SCK1*b* and SCK2*b* and the emission clock signals ECK1 and ECK2, and accordingly, the power consumption of the display device may be reduced.

Referring to FIG. 16C, when the display device 100 is driven in the second mode (e.g., when the display device 100 is driven at a low frequency), the scan clock signals SCK1*a* and SCK2*a* may be supplied to the first scan driver 130 from the timing controller 120, and the scan clock signals SCK1*b* and SCK2*b* may be supplied to the second scan driver 160 from the timing controller 120.

The first scan driver 130 may generate an enable first scan signal GV according to the scan clock signals SCK1*a* and SCK2*a*. The second scan driver 160 may generate the scan signals GI, GC, GB, and GW according to the scan clock signals SCK1*b* and SCK2*b*.

The first emission driver 140 may be in the off-state according to the low-level first control signal CS1 and the high-level second control signal CS2. The second emission driver 150 may sequentially generate a disable emission control signal EM according to the low-level first control signal CS1, the high-level second control signal CS2, a first scan signal GV, and an inverting first scan signal GVB.

The emission clock signals ECK1 and ECK2 may not be supplied during the period in which the display device 100 is driven in the second mode. As such, unnecessary power may not be consumed corresponding to the emission clock signals ECK1 and ECK2, and accordingly, the power consumption of the display device may be reduced.

Figure 17A:
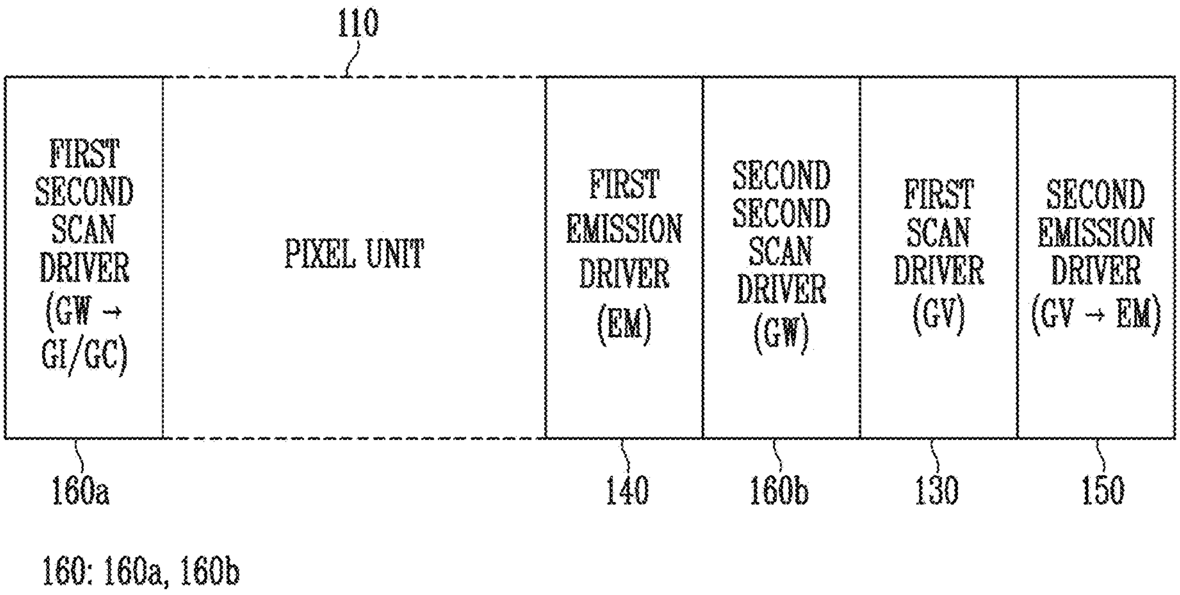
FIGS. 17A and 17B are diagrams illustrating one or more embodiments of an arrangement of drivers.
Figure 17B:
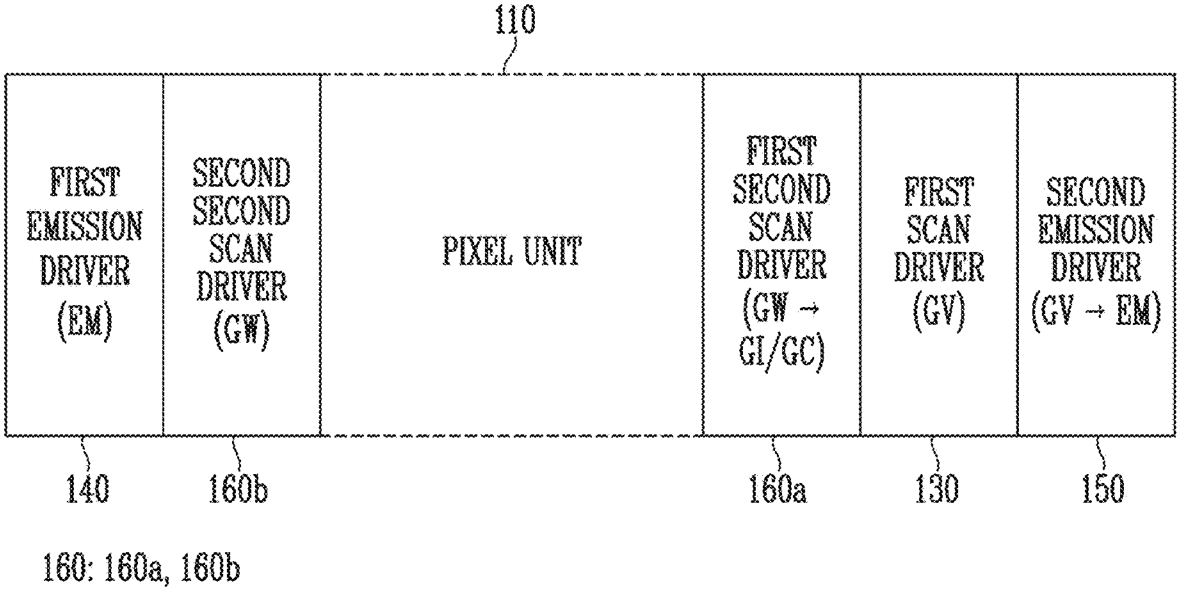

FIGS. 17A and 17B are diagrams illustrating one or more embodiments of an arrangement of drivers.

Referring to FIG. 17A, a first second scan driver 160*a* may be arranged at the left of the pixel unit 110, and the first emission driver 140, a second second scan driver 160*b*, the first scan driver 130, and the second emission driver 150 may be arranged at the right of the pixel unit 110. When comparing FIG. 17A with FIG. 16A, the second second scan driver 160*b* may be additionally arranged at the right of the pixel unit 110. An enable second scan signal GW supplied for a relatively short time may be stably supplied.

Referring to FIG. 17B, the first emission driver 140 and the second second scan driver 160*b* may be arranged at the left of the pixel unit 100, and the first second scan driver 160*a*, the first scan driver 130, and the second emission driver 150 may be arranged at the right of the pixel unit 110.

However, the present disclosure is not limited to the arrangements of the drivers illustrated in the figures, and the positions of the drivers 130, 140, 150, 160*a*, and 160*b* may be variously modified as needed or desired. As an example, in FIGS. 17A and 17B, the drivers 130, 140, 150, 160*a*, and 160*b* may be reversely arranged with respect to the pixel unit 110.

In the display device and the method of driving the same in accordance with one or more embodiments of the present disclosure, the first emission driver and the second emission driver may be selectively driven according to a mode, and accordingly, power consumption may be reduced.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:

pixels connected to scan lines and emission control lines;

a scan driver configured to supply a scan signal to the scan lines according to scan clock signals;

a first emission driver configured to supply a first emission control signal to the emission control lines according to emission clock signals, when the display device is driven in a first mode;

a second emission driver configured to supply a second emission control signal to the emission control lines according to the scan signal, when the display device is driven in a second mode; and a timing controller configured to control the scan driver, the first emission driver, and the second emission driver.

2. The display device of claim 1, wherein an active period of one frame comprises the first mode, and the first mode is a display scan period in which a data signal is supplied to the pixels, and wherein a blank period of the one frame comprises the second mode, and the second mode is a self-scan period in which the data signal is not supplied.

3. The display device of claim 1, wherein the first mode is a high frequency driving mode in which the display device is driven at a high frequency equal to or higher than a reference frequency, and wherein the second mode is a low frequency driving mode in which the display device is driven at a low frequency lower than the reference frequency.

4. The display device of claim 1, wherein the scan driver comprises a plurality of stage circuits configured to supply the scan signal, and wherein a stage circuit from among the plurality of stage circuits comprises:

a first input terminal configured to receive a previous scan signal;

a second input terminal configured to receive a first scan clock signal;

a third input terminal configured to receive a second scan clock signal;

a first output terminal configured to output the scan signal;

a second output terminal configured to output an inverting scan signal;

a first power input terminal configured to receive a first power source; and a second power input terminal configured to receive a second power source lower than the first power source.

5. The display device of claim 4, wherein the stage circuit further comprises:

an input circuit configured to receive the previous scan signal;

a driver configured to invert and output an output signal of the input circuit;

an output circuit configured to invert and output an output signal of the driver; and a first capacitor connected between a common terminal of the input circuit and the driver and the second power input terminal.

6. The display device of claim 5, wherein the input circuit comprises a transmission gate connected between the first input terminal and the driver, wherein the transmission gate comprises a P-type first transistor and an N-type second transistor that are connected in parallel between the first input terminal and the driver, and wherein a gate electrode of the first transistor is connected to the second input terminal, and a gate electrode of the second transistor is connected to the third input terminal.

7. The display device of claim 5, wherein the driver comprises a P-type third transistor and an N-type fourth transistor that are connected in series between the first power input terminal and the second power input terminal, and wherein gate electrodes of the third transistor and the fourth transistor are connected to the input circuit, and a common node of the third transistor and the fourth transistor is connected to the second output terminal.

8. The display device of claim 5, wherein the output circuit comprises a P-type fifth transistor and an N-type sixth transistor that are connected in series between the first power input terminal and the second power input terminal, and wherein gate electrodes of the fifth transistor and the sixth transistor are connected to the second output terminal, and a common node of the fifth transistor and the sixth transistor is connected to the first output terminal.

9. The display device of claim 1, wherein the timing controller is configured to:

supply a high-level first control signal and a low-level second control signal to the first emission driver and the second emission driver when the display device is driven in the first mode; and supply a low-level first control signal and a high-level second control signal to the first emission driver and the second emission driver when the display device is driven in the second mode.

10. The display device of claim 9, wherein the first emission driver is configured to be driven when the high-level first control signal and the low-level second control signal are supplied, and wherein the second emission driver is configured to be driven when the low-level first control signal and the high-level second control signal are supplied.

11. The display device of claim 9, wherein the first emission driver comprises a plurality of stage circuits configured to supply the first emission control signal, and wherein a stage circuit from among the plurality of stage circuits comprises:

a first input terminal configured to receive a previous first emission control signal;

a second input terminal configured to receive a first emission clock signal;

a third input terminal configured to receive a second emission clock signal;

a fourth input terminal configured to receive the first control signal;

a fifth input terminal configured to receive the second control signal;

a first power input terminal configured to receive a first power source;

a second power input terminal configured to receive a second power source lower than the first power source; and an output terminal configured to output the first emission control signal.

12. The display device of claim 11, wherein the stage circuit further comprises:

an input circuit configured to receive the previous first emission control signal;

a first driver configured to invert and output an output signal of the input circuit;

an output circuit configured to invert and output an output signal of the first driver;

a second driver configured to electrically connect the first driver and the output circuit to each other when the high-level first control signal and the low-level second control signal are input, and block an electrical connection between the first driver and the output circuit in other cases; and a first capacitor connected between a common terminal of the input circuit and the first driver and the second power input terminal.

13. The display device of claim 12, wherein the input circuit comprises a transmission gate connected between the first input terminal and the first driver, wherein the transmission gate comprises a P-type first transistor and an N-type second transistor that are connected in parallel between the first input terminal and the first driver, and wherein a gate electrode of the first transistor is connected to the second input terminal, and a gate electrode of the second transistor is connected to the third input terminal.

14. The display device of claim 12, wherein the first driver comprises a P-type third transistor and an N-type fourth transistor that are connected in series between the first power input terminal and the second power input terminal, and wherein gate electrodes of the third transistor and the fourth transistor are connected to the input circuit, and a common node of the third transistor and the fourth transistor is connected to the second driver.

15. The display device of claim 12, wherein the second driver comprises:

a P-type seventh transistor connected between the first power input terminal and a first node, and comprising a gate electrode connected to the fourth input terminal;

an N-type eighth transistor connected between the first node and the first driver, and comprising a gate electrode connected to the fourth input terminal;

an N-type ninth transistor connected between the second power input terminal and a second node, and comprising a gate electrode connected to the fifth input terminal; and a P-type tenth transistor connected between the second node and the first driver, and comprising a gate electrode connected to the fifth input terminal.

16. The display device of claim 15, wherein the output circuit comprises a P-type fifth transistor and an N-type sixth transistor that are connected in series between the first power input terminal and the second power input terminal, and wherein a gate electrode of the fifth transistor is connected to the first node, a gate electrode of the sixth transistor is connected to the second node, and a common node of the fifth transistor and the sixth transistor is connected to the output terminal.

17. The display device of claim 9, wherein the second emission driver comprises a plurality of stage circuits configured to supply the second emission control signal, and wherein a stage circuit from among the plurality of stage circuits comprises:

a first input terminal configured to receive a next scan signal;

a second input terminal configured to receive a previous scan signal;

a third input terminal configured to receive a previous inverting scan signal;

a fourth input terminal configured to receive the second control signal;

a fifth input terminal configured to receive the first control signal;

a first power input terminal configured to receive a first power source;

a second power input terminal configured to receive a second power source lower than the first power source; and an output terminal configured to output the second emission control signal.

18. The display device of claim 17, wherein the stage circuit further comprises:

an input circuit configured to receive the next scan signal, the previous scan signal, and the previous inverting scan signal; and an output circuit configured to output the second emission control signal according to a signal supplied from the input circuit, when the low-level first control signal and the high-level second control signal are input.

19. The display device of claim 18, wherein the input circuit comprises:

a first transmission gate connected between the first input terminal and a first node;

a third transmission gate connected between the third input terminal and a second node; and a second transmission gate connected between the second input terminal and a third node.

20. The display device of claim 19, wherein each of the first transmission gate, the second transmission gate, and the third transmission gate comprises:

a P-type first transistor comprising a gate electrode connected to the fifth input terminal; and an N-type second transistor comprising a gate electrode connected to the fourth input terminal.

21. The display device of claim 19, wherein the output circuit comprises:

a P-type third transistor connected between the first power input terminal and a fourth node, and comprising a gate electrode connected to the first node;

an N-type fourth transistor connected between the fourth node and the second power input terminal, and comprising a gate electrode connected to the second node;

a P-type fifth transistor connected between the first power input terminal and the output terminal, and comprising a gate electrode connected to the third node;

an N-type sixth transistor connected between the output terminal and the second power input terminal, and comprising a gate electrode connected to the fourth node;

a P-type seventh transistor connected between the first power input terminal and the third node, and comprising the gate electrode connected to the fourth input terminal;

an N-type eighth transistor connected between the fourth node and the second power input terminal, and comprising a gate electrode connected to the fifth input terminal; and a first capacitor connected between the fourth node and the second power input terminal.

22. A display device comprising:

pixels connected to scan lines and emission control lines;

a scan driver configured to supply a scan signal to the scan lines according to scan clock signals;

a first emission driver configured to supply a first emission control signal to the emission control lines according to emission clock signals, when the display device is driven in a first mode;

a second emission driver configured to supply a second emission control signal to the emission control lines according to the scan signal, when the display device is driven in a second mode; and a timing controller configured to control the scan driver, the first emission driver, and the second emission driver, wherein the timing controller is configured to not supply the emission clock signals to the first emission driver when the display device is driven in the second mode.

23. A method of driving a display device, the method comprising:

sequentially supplying a scan signal to scan lines;

supplying, by a first emission driver, a first emission control signal using an emission clock signal, when the display device is driven in a first mode; and supplying, by a second emission driver, a second emission control signal using the scan signal, when the display device is driven in a second mode different from the first mode.

24. The method of claim 23, wherein an active period of one frame comprises the first mode, and the first mode is a display scan period in which a data signal is supplied to pixels, and wherein a blank period of the one frame comprises the second mode, and the second mode is a self-scan period in which the data signal is not supplied.

25. The method of claim 23, wherein the first mode is a high frequency driving mode in which the display device is driven at a high frequency equal to or higher than a reference frequency, and wherein the second mode is a low frequency driving mode in which the display device is driven at a low frequency lower than the reference frequency.

* * * * *